United States Patent
Chung et al.

(10) Patent No.: US 11,336,147 B2
(45) Date of Patent: May 17, 2022

(54) SPEED REDUCING DEVICE HAVING POWER SOURCE

(71) Applicant: Delta Electronics, Inc., Taoyuan (TW)

(72) Inventors: Chi-Wen Chung, Taoyuan (TW); En-Yi Chu, Taoyuan (TW); Hung-Wei Lin, Taoyuan (TW); Ming-Li Tsao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 282 days.

(21) Appl. No.: 16/585,368

(22) Filed: Sep. 27, 2019

(65) Prior Publication Data

US 2020/0144888 A1 May 7, 2020

Related U.S. Application Data

(60) Provisional application No. 62/756,706, filed on Nov. 7, 2018.

(30) Foreign Application Priority Data

May 31, 2019 (CN) .......................... 201910469192.3

(51) Int. Cl.
*H02K 7/075* (2006.01)
*H02K 7/116* (2006.01)
(Continued)

(52) U.S. Cl.
CPC ............. *H02K 7/075* (2013.01); *F16H 21/18* (2013.01); *H02K 7/116* (2013.01); *H02K 15/165* (2013.01); *F16H 2057/02073* (2013.01)

(58) Field of Classification Search
CPC ...... H02K 7/075; H02K 7/116; H02K 15/165; H02K 21/16; F16H 21/18; F16H 2057/02073; F16H 2001/325; F16H 1/34
(Continued)

(56) References Cited

U.S. PATENT DOCUMENTS 4,487,091 A * 12/1984 Pierrat ...................... F16H 1/32
475/168
8,857,546 B2 * 10/2014 Yamamoto .............. F16H 57/02
180/65.6
(Continued)

FOREIGN PATENT DOCUMENTS

CN 201185372 Y 1/2009
CN 104864036 A 8/2015
(Continued)

*Primary Examiner* — John K Kim
(74) *Attorney, Agent, or Firm* — Kirton McConkie; Evan R. Witt

(57) ABSTRACT

A speed reducing device includes a motor and a speed reducing mechanism. The speed reducing mechanism includes at least one roller assembly, a cycloid disc, at least one fixing disc and a positioning assembly. The roller assembly is disposed within a rotor portion of the motor. While the roller assembly is rotated with the rotor portion, the roller assembly is eccentrically revolved. The roller assembly includes a wheel disc and at least one roller. The cycloid disc includes a main body and at least one cycloid tooth structure. The cycloid tooth structure is protruded from an outer periphery of the main body and in contact with the corresponding roller. While the roller assembly is eccentrically revolved, the at least one cycloid tooth structure is pushed against the corresponding roller, so that the cycloid disc is correspondingly rotated.

15 Claims, 16 Drawing Sheets

(51) Int. Cl.
*F16H 21/18* (2006.01)
*H02K 15/16* (2006.01)
*F16H 57/02* (2012.01)

(58) Field of Classification Search
USPC .............................................. 310/20, 83, 99
See application file for complete search history.

(56) References Cited

U.S. PATENT DOCUMENTS

| | | | |
|---|---|---|---|
| 9,752,653 B1* | 9/2017 | Yao | F16H 1/32 |
| 9,783,262 B2* | 10/2017 | Dubose | B62M 11/02 |
| 2008/0007130 A1* | 1/2008 | Edelson | H02K 41/06 |
| | | | 310/82 |
| 2009/0044651 A1* | 2/2009 | Yamamori | B62D 5/008 |
| | | | 74/461 |
| 2009/0058208 A1* | 3/2009 | Kimura | H02K 5/1732 |
| | | | 310/83 |
| 2012/0326573 A1* | 12/2012 | Yamamoto | F16H 1/32 |
| | | | 310/67 R |
| 2013/0099554 A1* | 4/2013 | Lee | B60K 7/0007 |
| | | | 301/6.5 |
| 2013/0257202 A1* | 10/2013 | Takuno | H02K 7/116 |
| | | | 310/83 |
| 2020/0144888 A1* | 5/2020 | Chung | H02K 7/075 |

FOREIGN PATENT DOCUMENTS

| | | |
|---|---|---|
| CN | 205331325 U | 6/2016 |
| CN | 105743276 A | 7/2016 |
| CN | 108468758 A | 8/2018 |
| CN | 208041059 U | 11/2018 |
| JP | 2006217779 A | 8/2006 |
| TW | M371813 U | 1/2010 |
| TW | I431209 B | 3/2014 |
| TW | M512259 U | 11/2015 |
| TW | I584998 B | 6/2017 |
| TW | 201831806 A | 9/2018 |
| WO | 9710452 A1 | 3/1997 |

* cited by examiner

SPEED REDUCING DEVICE HAVING POWER SOURCE

CROSS-REFERENCE TO RELATED APPLICATION

This application claims the benefit of U.S. Provisional Application No. 62/756,706 filed on Nov. 7, 2018, and entitled "SPEED REDUCING DEVICE HAVING POWER SOURCE AND SPEED REDUCER". This application claims the priority to Chinese Patent Application No. 201910469192.3 filed on May 31, 2019. The entirety of which is hereby incorporated by reference.

FIELD OF THE INVENTION

The present disclosure relates to a speed reducing device, and more particularly to a speed reducing device having a power source.

BACKGROUND OF THE INVENTION

Generally, a motor is operated at a high speed and a low torsion force. In other words, it is difficult for the motor to drive a large-sized load. Consequently, for allowing the motor to drive a heavy object, a reducer is used for reducing the rotating speed of the motor and increasing the torsion force.

Conventionally, the reducer and the motor are separate components. It is necessary to connect the reducer with the motor through an additional connection structure such as a shaft coupling or a gear box. In such way, the volume and weight of the overall structure of the reducer and the motor are increased. In other words, the connection structure for connecting the reducer and the motor cannot be applied to the device that requires light weight and compact space. For example, the connection structure is not suitably applied to an industrial robotic arm or a power assisting device.

Nowadays, a cycloid speed reducer with a motor has been disclosed. Under this circumstance, the shaft coupling or the gear box for connecting the reducer and the motor is omitted. The cycloid speed reducer comprises cycloid discs and roller assemblies. The cycloid disc has teeth to be contacted with the rollers of the corresponding roller assembly. For forming the teeth, it is necessary to form a concave structure in a surface of the main body of the cycloid disc. Then, the concave structure is machined to form inner teeth. As known, it is difficult to machine the teeth in the concave structure.

Therefore, there is a need of providing an improved speed reducing device having a power source in order to overcome the above issues.

SUMMARY OF THE INVENTION

An object of the present disclosure provides a speed reducing device comprising a motor and a speed reducing mechanism. The motor and the speed reducing mechanism are combined together without the use of a connection structure (e.g., a shaft coupling or a gear box). Since the motor and the speed reducing mechanism are combined as an integral structure, the weight and volume of the speed reducing device are reduced. Moreover, when compared with the conventional cycloid speed reducer, the inner teeth of the speed reducing device of the present disclosure can be machined more easily.

Another object of the present disclosure provides a speed reducing device having a power source. The speed reducing device is capable of achieving good heat-dissipating efficacy, high rigidness and high reduction ratio.

In accordance with an aspect of the present disclosure, a speed reducing device having a power source is provided. The speed reducing device includes a motor and a speed reducing mechanism. The motor is served as the power source and includes a stator portion and a rotor portion. The rotor portion is a power input terminal of the speed reducing device. The rotor portion is driven to rotate by the stator portion, and the rotor portion includes a rotor casing assembly with a hollow structure. The rotor casing assembly includes a ring-shaped inner wall and a ring-shaped outer wall, and an eccentricity exists between the ring-shaped inner wall and the ring-shaped outer wall of the rotor casing assembly. At least a portion of the speed reducing mechanism is located at an inner side of the motor. The speed reducing mechanism includes at least one roller assembly, a cycloid disc, at least one fixing disc and a positioning assembly. The at least one roller assembly is disposed within the ring-shaped inner wall of the rotor casing assembly. While the roller assembly is rotated with the rotor portion, the roller assembly is eccentrically revolved. The roller assembly includes a wheel disc with a hollow portion and at least one roller. The at least one roller is disposed on an inner wall of the wheel disc. The cycloid disc is used as a power output terminal of the speed reducing device and disposed within the hollow portion of the wheel disc. The cycloid disc includes a main body and at least one cycloid tooth structure. The at least one cycloid tooth structure is protruded from an outer periphery of the main body and in contact with the corresponding roller. While the roller assembly is eccentrically revolved, the at least one cycloid tooth structure is pushed against the corresponding roller, so that the cycloid disc is correspondingly rotated. The at least one fixing disc is located at an outer side of the roller assembly. The fixing disc is stationary and not rotatable relative to the roller assembly. The positioning assembly includes at least one positioning hole and at least one positioning pin. The at least one positioning hole is formed on the fixing disc and the at least one positioning pin is formed on the wheel disc of the roller assembly, or the at least one positioning pin is formed on the fixing disc and the at least one positioning hole is formed in the wheel disc of the roller assembly. The at least one positioning pin is inserted into the corresponding positioning hole. A radial gap is formed between the positioning pin and the corresponding positioning hole. The positioning assembly and the fixing disc are collaboratively formed as a fixing end, so that the roller assembly is not rotated about its own axle.

In accordance with another aspect of the present disclosure, a speed reducing device having a power source is provided. The speed reducing device includes a motor and a speed reducing mechanism. The motor is served as the power source and includes a stator portion and a rotor portion. The rotor portion is a power input terminal of the speed reducing device. The rotor portion is driven to rotate by the stator portion. The rotor portion includes a rotor casing assembly with a hollow structure. The rotor casing assembly includes a ring-shaped inner wall and a ring-shaped outer wall, and an eccentricity exists between the ring-shaped inner wall and the ring-shaped outer wall of the rotor casing assembly. At least a portion of the speed reducing mechanism is located at an inner side of the motor. The speed reducing mechanism includes a first roller assembly, a second roller assembly, a cycloid disc, a first fixing disc and a positioning assembly. The first roller assembly is disposed within the ring-shaped inner wall of the rotor casing assembly. While the first roller assembly is rotated with the rotor portion, the first roller assembly is eccentrically revolved. The first roller assembly includes a first wheel disc with a hollow portion and at least one first roller. The at least one first roller is disposed on an inner wall of the first wheel disc. The second roller assembly is disposed beside the first roller assembly, disposed within the ring-shaped inner wall of the rotor casing assembly, and linked with the first roller assembly. While the second roller assembly is rotated with the rotor portion, the second roller assembly is eccentrically revolved, and the first roller assembly and the second roller assembly are synchronously rotated along the same direction. The second roller assembly includes a second wheel disc with a hollow portion and at least one second roller. The at least one second roller is disposed on an inner wall of the second wheel disc. The cycloid disc is used as a power output terminal of the speed reducing device and disposed within the hollow portion of the second wheel disc. The cycloid disc includes a main body and at least one cycloid tooth structure. The at least one cycloid tooth structure is protruded from an outer periphery of the main body and in contact with the corresponding second roller. While the second roller assembly is eccentrically revolved, the at least one cycloid tooth structure is pushed against the corresponding second roller, so that the cycloid disc is correspondingly rotated. The first fixing disc is connected with the stator portion, located at a first outer side of the speed reducing mechanism, and disposed beside the first roller assembly. The first fixing disc is stationary and not rotatable relative to the first roller assembly and the second roller assembly. The positioning assembly includes a fixed tooth wheel, wherein the fixed tooth wheel is disposed within the hollow portion of the first wheel disc and fixedly connected with the first fixing disc. The fixed tooth wheel includes at least one fixed tooth structure. The at least one fixed tooth structure is protruded from an outer periphery of the fixed tooth wheel and in contact with the corresponding first roller. The positioning assembly and the first fixing disc are collaboratively formed as a fixing end, so that the first roller assembly is not rotated about its own axle.

In accordance with a further aspect of the present disclosure, a speed reducing device having a power source is provided. The speed reducing device includes a motor and a speed reducing mechanism. The motor is served as the power source and includes a stator portion and a rotor portion. The rotor portion is a power input terminal of the speed reducing device. The rotor portion is driven to rotate by the stator portion. The rotor portion includes a rotor casing assembly with a hollow structure and a plurality of eccentric rings. The plurality of eccentric rings are disposed on a ring-shaped inner wall of the rotor casing assembly. Every two adjacent eccentric rings of the plurality of eccentric rings have opposite eccentric directions. At least a portion of the speed reducing mechanism is located at an inner side of the motor. The speed reducing mechanism includes a first roller assembly, a second roller assembly, a third roller assembly, a fourth roller assembly, a cycloid disc, at least one fixing disc and a positioning assembly. The first roller assembly is disposed within the corresponding eccentric ring. The first roller assembly includes a first wheel disc with a hollow portion and at least one first roller. The at least one first roller is disposed on an inner wall of the first wheel disc. The second roller assembly is disposed within the corresponding eccentric ring. The second roller assembly includes a second wheel disc with a hollow portion and at least one second roller. The at least one second roller is disposed on an inner wall of the second wheel disc. The second roller assembly is connected and linked with the first roller assembly. The third roller assembly is disposed within the corresponding eccentric ring. The third roller assembly includes a third wheel disc with a hollow portion and at least one third roller. The at least one third roller is disposed on an inner wall of the third wheel disc. The fourth roller assembly is disposed within the corresponding eccentric ring. The fourth roller assembly includes a fourth wheel disc with a hollow portion and at least one fourth roller. The at least one fourth roller is disposed on an inner wall of the fourth wheel disc. The fourth roller assembly is connected and linked with the third roller assembly. An eccentric direction of the third roller assembly and the fourth roller assembly and an eccentric direction of the first roller assembly and the second roller assembly are opposite. The cycloid disc is served as a power output terminal of the speed reducing device, a first portion of the cycloid disc is disposed within the hollow portion of the second wheel disc, and a second portion of the cycloid disc is disposed within the hollow portion of the third wheel disc. The cycloid disc includes a main body and at least one cycloid tooth structure. The at least one cycloid tooth structure is protruded from an outer periphery of the main body and in contact with the corresponding second roller and the corresponding third roller. While the rotor portion is rotated, the at least one cycloid tooth structure is pushed against the corresponding second roller and the corresponding third roller, so that the cycloid disc is correspondingly rotated. The at least one fixing disc is connected with the stator portion. The at least one fixing disc is stationary and not rotatable relative to the first roller assembly, the second roller assembly, the third roller assembly and the fourth roller assembly. A first portion of the positioning assembly is disposed within the hollow portion of the first wheel disc. A second portion of the positioning assembly is disposed within the hollow portion of the fourth wheel disc. The positioning assembly is connected with the fixing disc. The positioning assembly further includes at least one fixed tooth wheel. The fixed tooth wheel includes at least one fixed tooth structure. The at least one fixed tooth structure is protruded from an outer periphery of the fixed tooth wheel. Each of the at least one first roller and each of the at least one fourth roller are contacted with the corresponding fixed tooth structure of the fixed tooth wheel. The positioning assembly and the first fixing disc are collaboratively formed as a fixing end, so that the first roller assembly and the fourth roller assembly are not rotated about their own axles.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
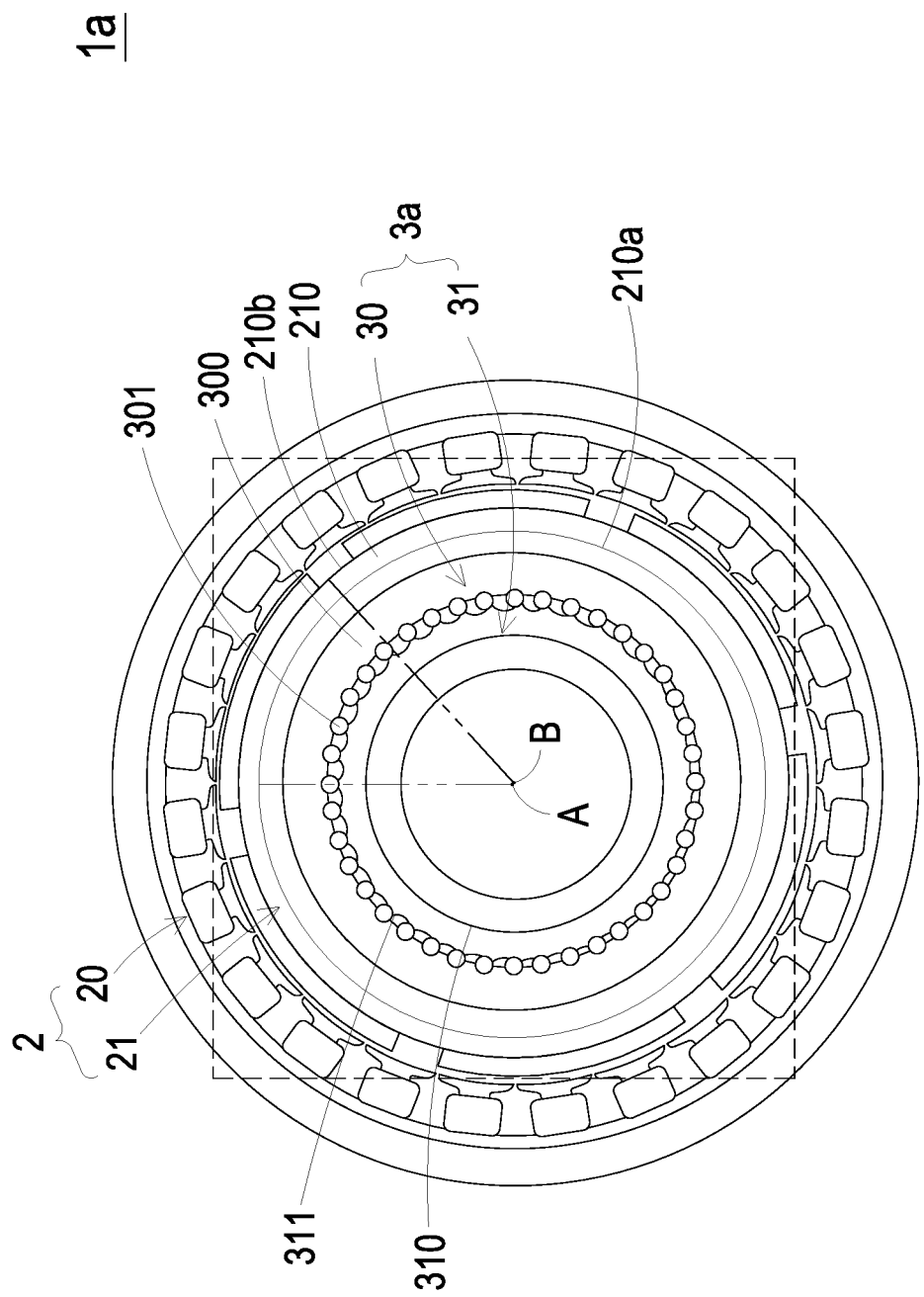
FIG. 1 is a schematic front view illustrating a speed reducing device having a power source according to a first embodiment of the present disclosure.
Figure 1A:
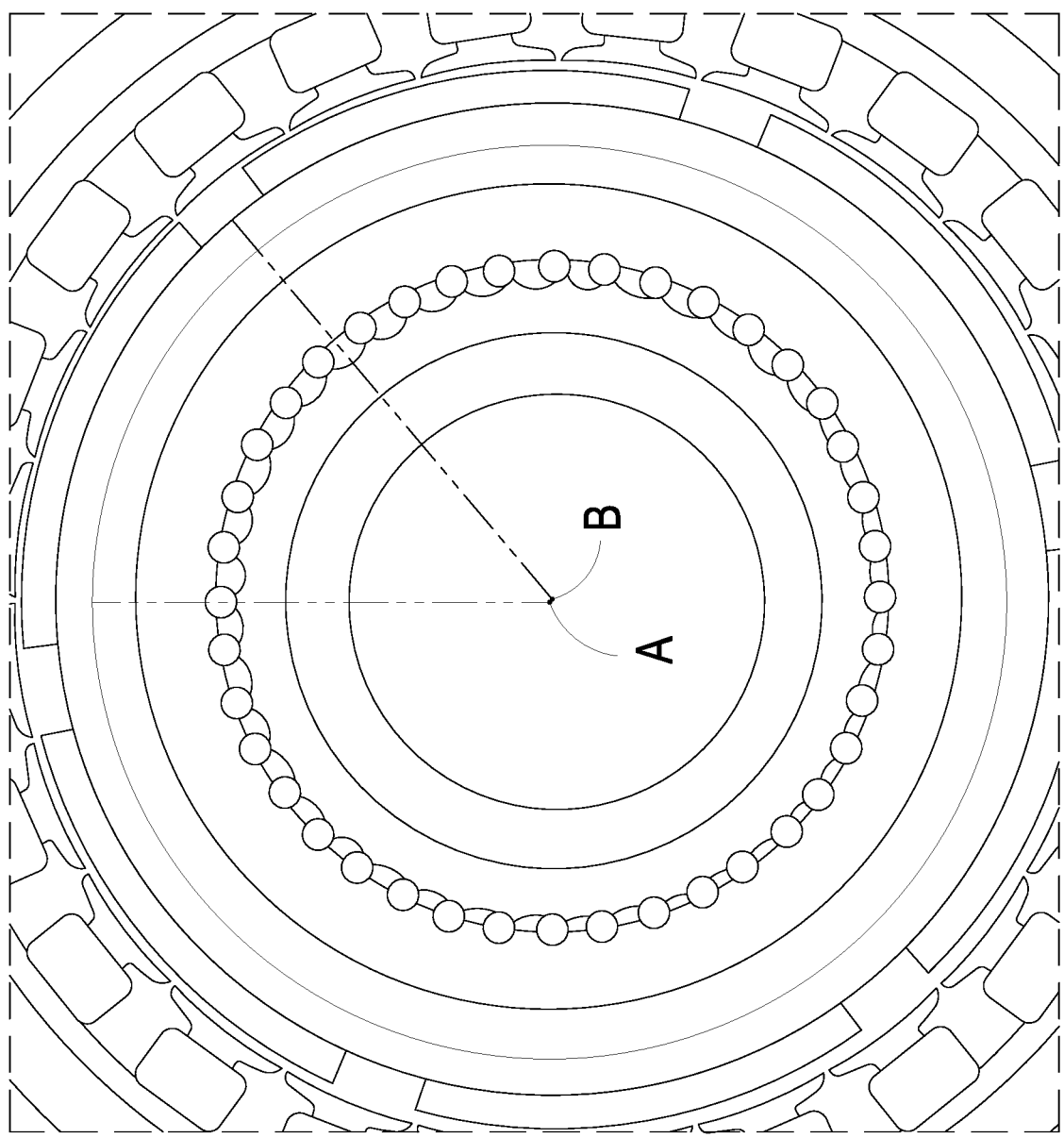
FIG. 1a is an enlarged graph of the dashed line block of FIG. 1.
Figure 2:
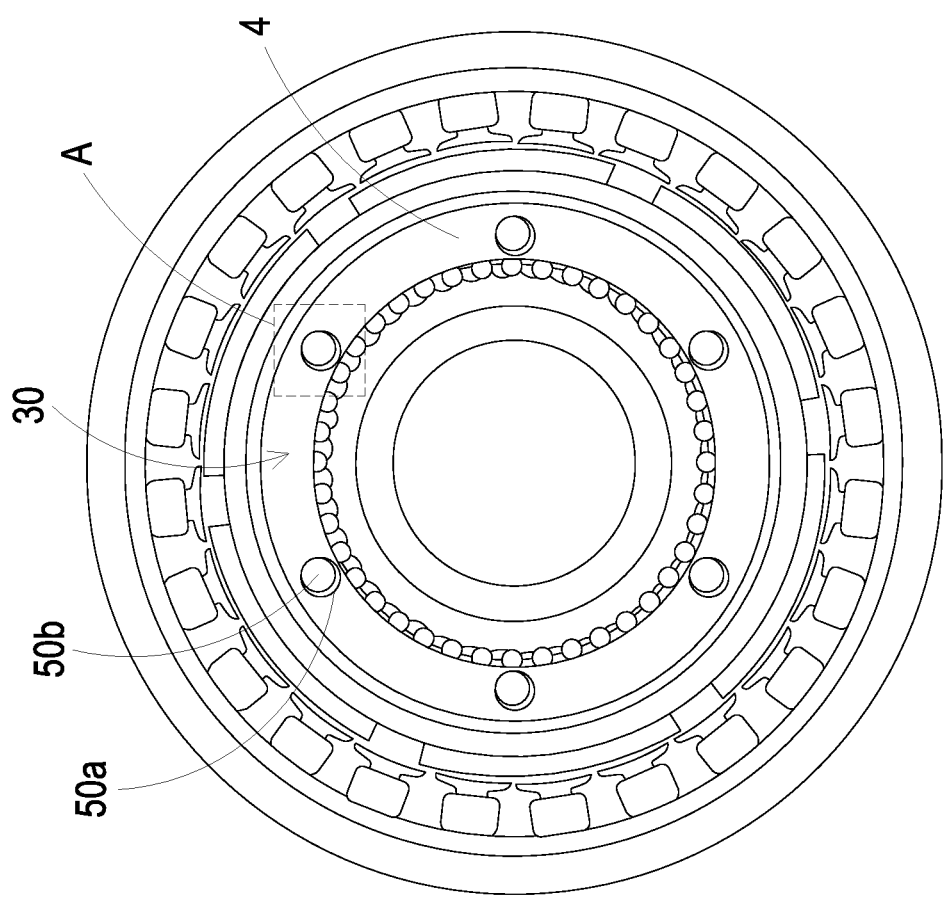
FIG. 2 is a schematic rear view illustrating the speed reducing device according to the first embodiment of the present disclosure.
Figure 3:
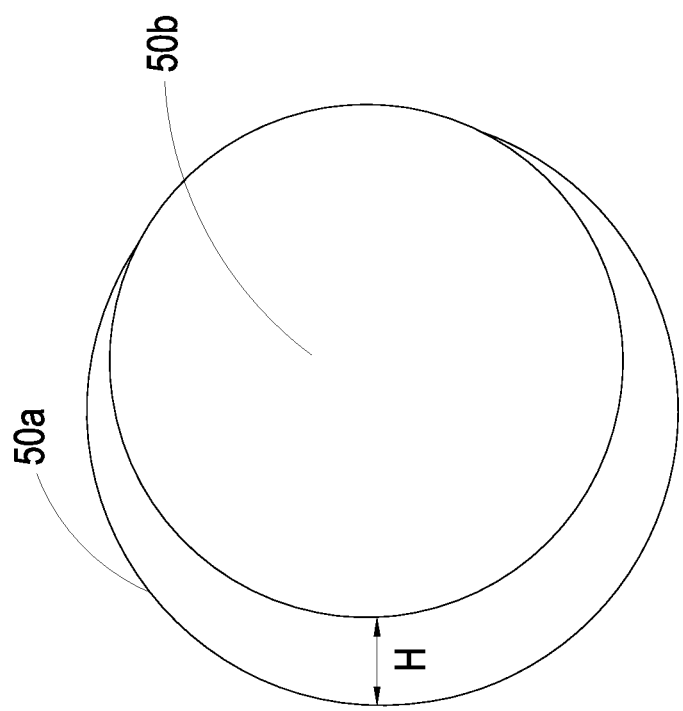
FIG. 3 is a schematic enlarged view illustrating the region A of the speed reducing device as shown in FIG. 2.

Please refer to FIGS. 1, 2 and 3. FIG. 1 is a schematic front view illustrating a speed reducing device having a power source according to a first embodiment of the present disclosure. FIG. 1a is an enlarged graph of the dashed line block of FIG. 1. FIG. 2 is a schematic rear view illustrating the speed reducing device according to the first embodiment of the present disclosure. FIG. 3 is a schematic enlarged view illustrating the region A of the speed reducing device as shown in FIG. 2. The speed reducing device having a power source (hereinafter referred to as the speed reducing device 1a) can be applied to various power mechanical devices such as industrial robotic arms or power assisting devices in order to provide a speed reducing function. In this embodiment, the speed reducing device 1a is a one-stage cycloid reducer.

The speed reducing device 1a comprises a motor 2 served as a power source, a speed reducing mechanism 3a, a fixing disc 4 and a positioning assembly.

In an embodiment, the motor 2 is disposed around the speed reducing mechanism 3a. For example, the motor 2 is a radial-flux motor. The motor 2 comprises a stator portion 20 and a rotor portion 21. The stator portion 20 is located at the outer side of the overall motor 2. The rotor portion 21 is located at the inner side of the overall motor 2. In this embodiment, the rotor portion 21 comprises a rotor casing assembly 210. The rotor casing assembly 210 is ring-shaped and has a hollow structure. The rotor casing assembly 210 includes a ring-shaped inner wall 210a and a ring-shaped outer wall 210b. There is an eccentricity between the ring-shaped inner wall 210a and the ring-shaped outer wall 210b of the rotor casing assembly 210. That is, the eccentricity exists between the center of the ring-shaped inner wall 210a and the center of the ring-shaped outer wall 210b.

In the embodiment of FIGS. 1 and 2, the motor 2 is a radial-flux motor. In another embodiment, the motor 2 is an axial-flux motor. The functions of the axial-flux motor are similar to those of the radial-flux motor, and the structure of the axial-flux motor is well known to those skilled in the art. Consequently, the structure of the axial-flux motor is not redundantly described herein.

At least a portion of the speed reducing mechanism 3a is located at the inner side of the motor 2 and accommodated within the hollow structure of the rotor casing assembly 210. In an embodiment, the speed reducing mechanism 3a comprises a roller assembly 30 and a cycloid disc 31. The roller assembly 30 is disposed on the ring-shaped inner wall 210a of the rotor casing assembly 210. While the rotor portion 21 is rotated relative to the stator portion 20, the roller assembly 30 is rotated with the rotor portion 21. Due to the eccentricity between the ring-shaped inner wall 210a and the ring-shaped outer wall 210b of the rotor casing assembly 210, the roller assembly 30 is eccentrically revolved about the center of the ring-shaped outer wall 210b of the rotor casing assembly 210. The roller assembly 30 comprises a wheel disc 300 and at least one roller 301. The wheel disc 300 has a hollow portion. The at least one roller 301 is disposed on an inner wall of the wheel disc 300.

The cycloid disc 31 is disposed within the hollow portion of the wheel disc 300 of the roller assembly 30. The cycloid disc 31 comprises a main body 310 and at least one cycloid tooth structure 311. The at least one cycloid tooth structure 311 is protruded from an outer periphery of the main body 310 and in contact with the corresponding roller 301. While the roller assembly 30 is rotated with the rotor portion 21 and the roller assembly 30 is eccentrically revolved about the center of the ring-shaped outer wall 210b of the rotor casing assembly 210, the at least one cycloid tooth structure 311 is pushed against the corresponding roller 301. Consequently, the cycloid disc 31 is correspondingly rotated.

The fixing disc 4 is connected with a disc surface of the wheel disc 300 and located at the outer side of the roller assembly 30. The fixing disc 4 is stationary and not rotatable. In some other embodiments, the fixing disc 4 is fixed on other components of the speed reducing device 1a (e.g., the stator portion 20) or any other appropriate components as long as the fixing disc 4 is stationary and not rotatable.

In an embodiment, the positioning assembly comprises at least one positioning structure and at least one positioning pin 50b. The at least one positioning structure is a positioning hole 50a formed in the fixing disc 4. The at least one positioning pin 50b is protruded from the wheel disc 300 of the roller assembly 30. Each positioning pin 50b and the corresponding positioning hole 50a are aligned with each other. Each positioning pin 50b is partially penetrated through the corresponding positioning hole 50a and contacted with the wall surface of the corresponding positioning hole 50a. Moreover, a radial gap H is formed between the positioning pin 50*b* and the corresponding positioning hole 50*a* (see FIG. 3). A first end of the positioning pin 50*b* is fixedly connected with the wheel disc 300. A second end of the positioning pin 50*b* is inserted into the corresponding positioning hole 50*a*. The fixing disc 4 is stationary. While the rotor portion 21 is rotated, the roller assembly 30 is not rotated about its own axle (i.e., self-rotation) because the positioning assembly and the fixing disc 4 are collaboratively formed as a fixing end. As mentioned above, the radial gap H is formed between the positioning pin 50*b* and the corresponding positioning hole 50*a*. Consequently, while the roller assembly 30 is rotated with the rotor portion 21, the roller assembly 30 is eccentrically revolved about the center of the ring-shaped outer wall 210*b* of the rotor casing assembly 210. In FIGS. 1 and 1*a*, the reference sign "A" is the axle (or the axis) of the roller assembly 32, and is also the axle (or the axis) of the ring-shaped inner wall 210*a*. The reference sign "B" is the axle (or the axis) of the ring-shaped outer wall 210*b*.

In accordance with the present disclosure, the motor 2 and the speed reducing mechanism 3*a* of the speed reducing device 1*a* are combined as an integral structure. The motor 2 is located at the outer side of the speed reducing device 1*a* along the radial direction. At least a portion of the speed reducing mechanism 3*a* is located at the inner side of the speed reducing device 1*a* along the radial direction. While the roller assembly 30 is rotated with the rotor portion 21 and the roller assembly 30 is eccentrically revolved about the center of the ring-shaped outer wall 210*b* of the rotor casing assembly 210, the at least one cycloid tooth structure 311 of the cycloid disc 31 is pushed against the corresponding roller 301 of the roller assembly 30. Consequently, the cycloid disc 31 is correspondingly rotated. In such way, the purpose of reducing the speed in one stage can be achieved. Since it is not necessary to use an additional shaft coupling to connect the motor 2 and the speed reducing mechanism 3*a*, the volume and weight of the speed reducing device 1*a* are reduced. Since the motor 2 is located at the outer side of the speed reducing device 1*a* along the radial direction, electromechanical integration can be easily designed. Moreover, since the electromechanical is located at the outermost region, the heat-dissipating efficacy of the speed reducing device 1*a* is enhanced. The speed reducing device 1*a* is a cycloid speed reducing device. Consequently, the speed reducing device 1*a* has high rigidness and the high reduction ratio. Moreover, since the at least one cycloid tooth structure 311 of the cycloid disc 31 is formed as the outer tooth structure on the outer periphery of the main body 310, the cycloid tooth structure 311 can be machined more easily.

For example, the number of the at least one roller 301 of the roller assembly 30 is A, and the number of the at least one cycloid tooth structure 311 of the cycloid disc 31 is B. Under this circumstance, the reduction ratio of the speed reducing device 1*a* is equal to B/(B−A), wherein A and B are positive integers. Moreover, the rotor portion 21 of the motor 2 is a power input terminal of the speed reducing device 1*a*, and the cycloid disc 31 is a power output terminal of the speed reducing device 1*a*.

In an embodiment, the maximum value of the radial gap H between the positioning pin 50*b* and the corresponding positioning hole 50*a* is larger than or equal to twice the eccentricity between the center of the ring-shaped inner wall 210*a* and the center of the ring-shaped outer wall 210*b* of the rotor casing assembly 210. The cycloid disc 31 has a rotation center, and the cycloid disc 31 is rotatable about the rotation center. Especially, the position of each positioning hole 50*a* is different from the rotation center of the cycloid disc 31.

The positions of the at least one positioning hole 50*a* and the at least one positioning pin 50*b* of the positioning assembly are not restricted. It is noted that numerous modifications and alterations may be made while retaining the teachings of the disclosure. In another embodiment, the at least one positioning hole 50*a* is formed in the wheel disc 300 of the roller assembly 30, and the at least one positioning pin 50*b* is protruded from the fixing disc 4.

Figure 4:
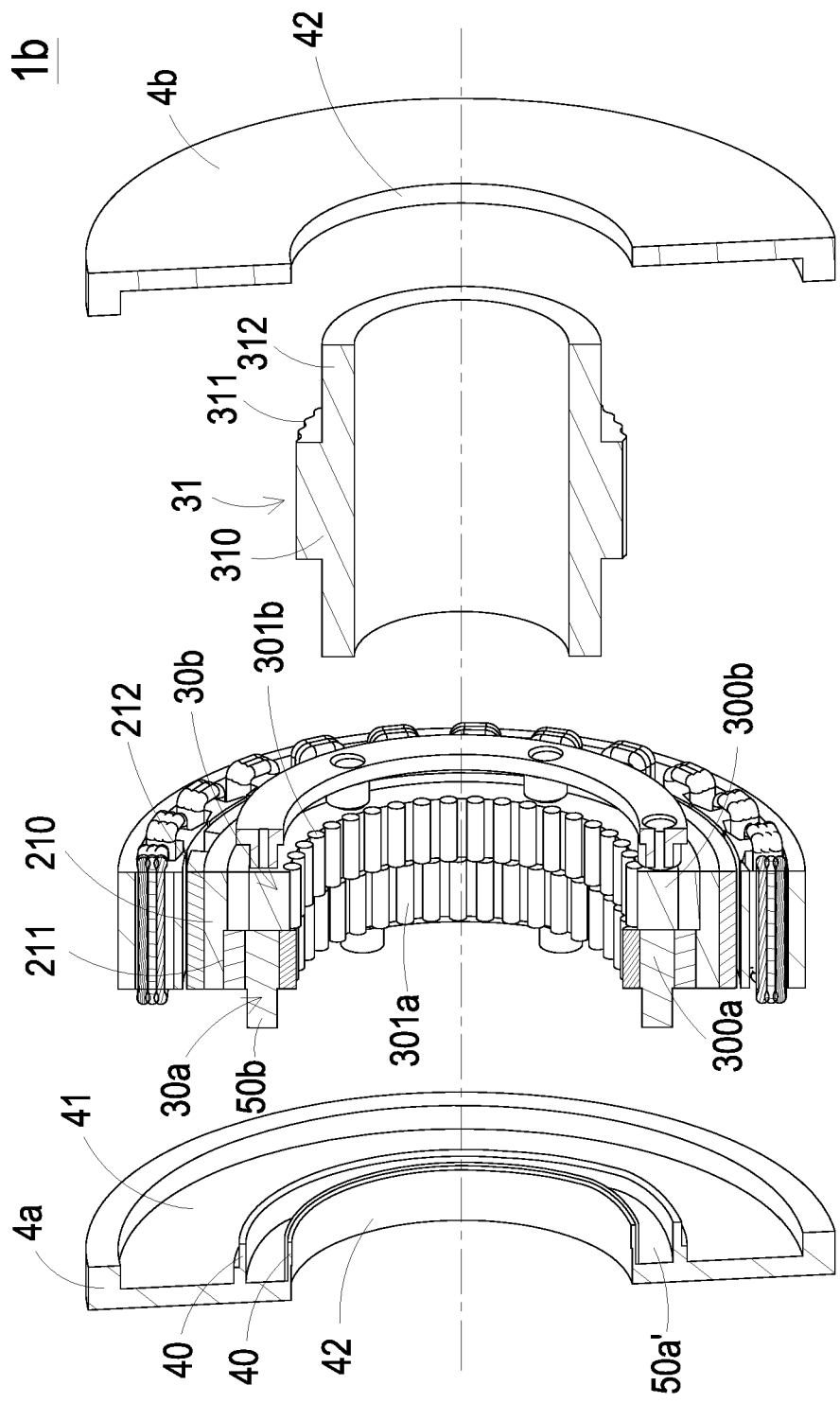
FIG. 4 is a schematic exploded view illustrating a speed reducing device having a power source according to a second embodiment of the present disclosure.
Figure 5:
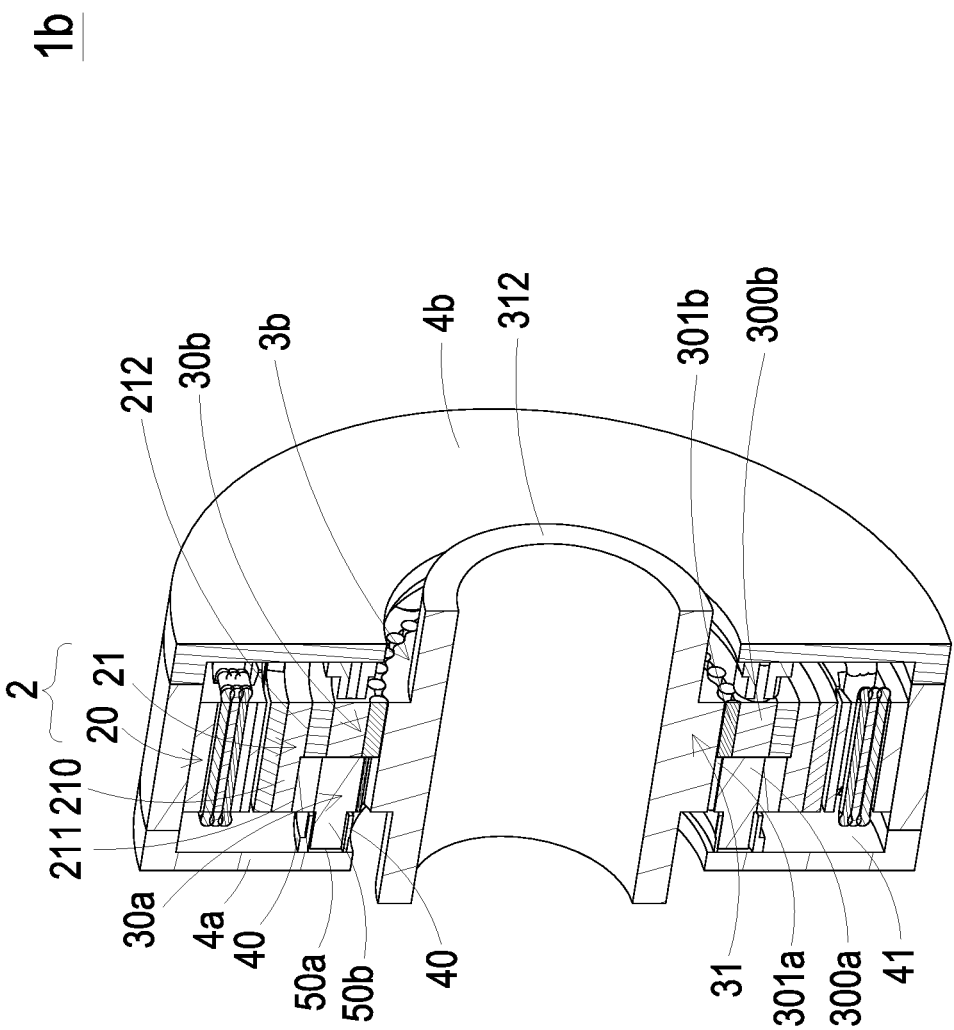
FIG. 5 is a schematic cutaway view illustrating the speed reducing device according to the second embodiment of the present disclosure.

Please refer to FIGS. 4 and 5. FIG. 4 is a schematic exploded view illustrating a speed reducing device having a power source according to a second embodiment of the present disclosure. FIG. 5 is a schematic cutaway view illustrating the speed reducing device according to the second embodiment of the present disclosure. In this embodiment, the speed reducing device 1*b* is a one-stage cycloid reducer. The speed reducing device 1*b* comprises a motor 2 served as a power source, a speed reducing mechanism 3*b*, a first fixing disc 4*a* and a positioning assembly. The structure and operation of the motor 2 of this embodiment are similar to those of the first embodiment. Component parts and elements corresponding to those of the first embodiment are designated by identical numeral references, and detailed descriptions thereof are omitted. In comparison with the first embodiment, the rotor casing assembly 210 of the rotor portion 21 of the motor 2 in this embodiment further comprises a first eccentric ring 211 and a second eccentric ring 212. The first eccentric ring 211 and the second eccentric ring 212 are disposed beside each other and disposed on the ring-shaped inner wall of the rotor casing assembly 210. The eccentric directions of the first eccentric ring 211 and the second eccentric ring 212 are opposite.

At least a portion of the speed reducing mechanism 3*b* is located at the inner side of the motor 2 and accommodated within the hollow structure of the rotor casing assembly 210. In an embodiment, the speed reducing mechanism 3*b* comprises a first roller assembly 30*a*, a second roller assembly 30*b* and a cycloid disc 31. The first roller assembly 30*a* is disposed within the first eccentric ring 211. The second roller assembly 30*b* is disposed within the second eccentric ring 212. The first roller assembly 30*a* comprises a first wheel disc 300*a* and at least one first roller 301*a*. The first wheel disc 300*a* has a hollow portion. The at least one first roller 301*a* is disposed on an inner wall of the first wheel disc 300*a*. The second roller assembly 30*b* comprises a second wheel disc 300*b* and at least one second roller 301*b*. The second wheel disc 300*b* has a hollow portion. The at least one second roller 301*b* is disposed on an inner wall of the second wheel disc 300*b*. The number of the at least one first roller 301*a* and the number of the at least one second roller 301*b* are equal. While the rotor portion 21 is rotated relative to the stator portion 20, the first roller assembly 30*a* and the second roller assembly 30*b* are rotated with the rotor portion 21. Due to the eccentricity between the ring-shaped inner wall and the ring-shaped outer wall of the rotor casing assembly 210, the first roller assembly 30*a* and the second roller assembly 30*b* are eccentrically revolved about the center of the ring-shaped outer wall of the rotor casing assembly 210.

A first portion of the cycloid disc 31 is disposed within the hollow portion of the first wheel disc 300*a* of the first roller assembly 30*a*. A second portion of the cycloid disc 31 is disposed within the hollow portion of the second wheel disc 300*b* of the second roller assembly 30*b*. The cycloid disc 31 comprises a main body 310 and at least one cycloid tooth structure 311. The at least one cycloid tooth structure 311 is protruded from an outer periphery of the main body 310 and in contact with the corresponding first roller 301*a* and the corresponding second roller 301b. While the first roller assembly 30a and the second roller assembly 30b are rotated with the rotor portion 21 and the first roller assembly 30a and the second roller assembly 30b are eccentrically revolved about the center of the ring-shaped outer wall of the rotor casing assembly 210, the at least one cycloid tooth structure 311 is pushed against the corresponding first roller 301a and the corresponding second roller 301b. Consequently, the cycloid disc 31 is correspondingly rotated.

In this embodiment, the first fixing disc 4a is connected with the stator portion 20. The first fixing disc 4a is located at a first outer side of the speed reducing mechanism 3b and disposed beside the first roller assembly 30a. The first fixing disc 4a is stationary and not rotatable.

In an embodiment, the positioning assembly comprises at least one positioning structure and at least one positioning pin 50b. The at least one positioning structure is a positioning groove 50a' which is a ring-shaped groove that is formed in the first fixing disc 4a. The positioning pin 50b is perpendicularly protruded from the wheel surface of the first wheel disc 300a of the first roller assembly 30a. Each positioning pin 50b and the corresponding positioning groove 50a' are aligned with each other. Each positioning pin 50b is partially penetrated through the corresponding positioning groove 50a' and contacted with the wall surface of the corresponding positioning groove 50a'. Moreover, a radial gap (not shown) is formed between the positioning pin 50b and the corresponding positioning groove 50a'. A first end of the positioning pin 50b is fixedly connected with the first wheel disc 300a. A second end of the positioning pin 50b is inserted into the corresponding positioning groove 50a'. The first fixing disc 4a is stationary. While the rotor portion 21 is rotated, the first roller assembly 30a is not rotated about its own axle (i.e., self-rotation) because the positioning assembly and the first fixing disc 4a are collaboratively formed as a fixing end. As mentioned above, the radial gap is formed between the positioning pin 50b and the corresponding positioning groove 50a'. Consequently, while the first roller assembly 30a is rotated with the rotor portion 21, the first roller assembly 30a is eccentrically revolved about the center of the ring-shaped outer wall of the rotor casing assembly 210.

The speed reducing device 1b has the functions of the speed reducing device 1a as shown in FIG. 1. In this embodiment, the speed reducing mechanism 3b of the speed reducing device 1b comprises the first roller assembly 30a and the second roller assembly 30b. The eccentric directions of the first eccentric ring 211 and the second eccentric ring 212 are opposite. The first roller assembly 30a is disposed within the first eccentric ring 211. The second roller assembly 30b is disposed within the second eccentric ring 212. Under this circumstance, the first roller assembly 30a and the second roller assembly 30b are balanced by each other, and the number of the at least one first roller 301a of the first roller assembly 30a and the at least one second roller 301b of the second roller assembly 30b to be effectively forced is increased. Consequently, the speed reducing device 1b is capable of achieving dynamic balance.

For example, the number of the at least one first roller 301a of the first roller assembly 30a is A, the number of the at least one second roller 301b of the second roller assembly 30b is A, and the number of the at least one cycloid tooth structure 311 of the cycloid disc 31 is B. Under this circumstance, the reduction ratio of the speed reducing device 1b is equal to B/(B−A), wherein A and B are positive integers. Moreover, the rotor portion 21 of the motor 2 is a power input terminal of the speed reducing device 1b, and the cycloid disc 31 is a power output terminal of the speed reducing device 1b.

In an embodiment, the maximum value of the radial gap between the positioning pin 50b and the corresponding positioning groove 50a' is larger than or equal to twice the eccentricity between the center of the ring-shaped inner wall and the center of the ring-shaped outer wall of the rotor casing assembly 210. The cycloid disc 31 is rotatable about a rotation center. Especially, the position of each positioning groove 50a' is different from the rotation center of the cycloid disc 31.

The positions of the at least one positioning groove 50a' and the at least one positioning pin 50b of the positioning assembly are not restricted. It is noted that numerous modifications and alterations may be made while retaining the teachings of the disclosure. In another embodiment, the at least one positioning groove 50a' is formed in the first wheel disc 300a of the first roller assembly 30a, and the at least one positioning pin 50b is perpendicularly protruded from the first fixing disc 4a.

The first fixing disc 4a further comprises two extension walls 40. The two extension walls 40 are separated from each other and perpendicularly protruded from the disc surface 41 of the first fixing disc 4a. The positioning groove 50a' is defined by the two extension walls 40 and the disc surface 41 of the first fixing disc 4a collaboratively.

In some embodiments, the speed reducing device 1b further comprises a second fixing disc 4b. The second fixing disc 4b is connected with the stator portion 20. The second fixing disc 4b is located at a second outer side of the speed reducing mechanism 3b and disposed beside the second roller assembly 30b. The first outer side and the second outer side of the speed reducing mechanism 3b are opposed to each other. The second fixing disc 4b is stationary and not rotatable. The speed reducing mechanism 3b is covered by the first fixing disc 4a, the second fixing disc 4b and the motor 2 collaboratively.

In some embodiments, the first fixing disc 4a and the second fixing disc 4b comprise corresponding central openings 42. The cycloid disc 31 comprises an output shaft 312. The output shaft 312 runs through a middle region of the main body 310 of the cycloid disc 31. A first end of the output shaft 312 is penetrated through the central opening 42 of the first fixing disc 4a. A second end of the output shaft 312 is penetrated through the central opening 42 of the second fixing disc 4b. Consequently, the output shaft 312 may be served as the power output terminal of the speed reducing device 1b.

Figure 6:
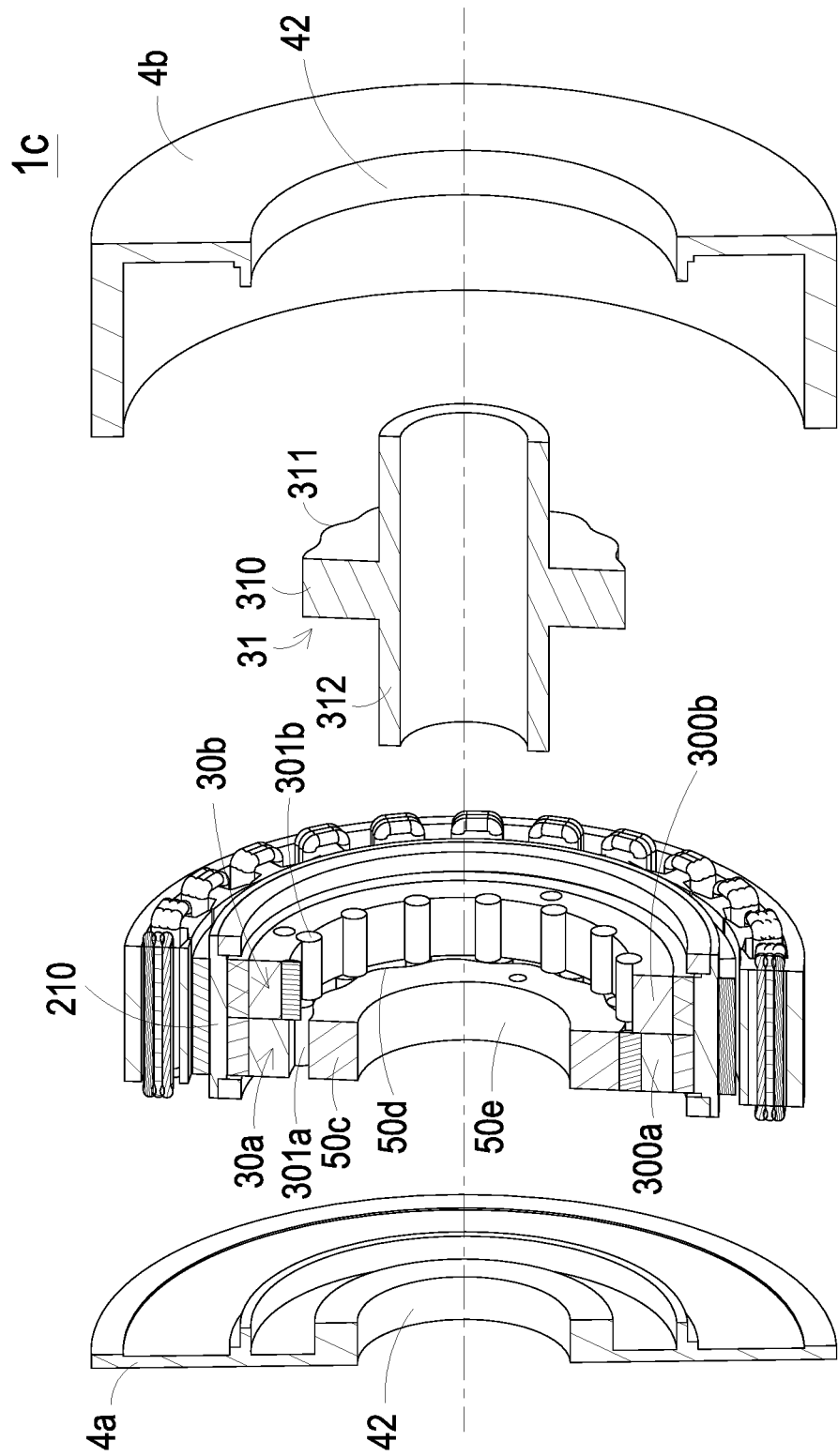
FIG. 6 is a schematic exploded view illustrating a speed reducing device having a power source according to a third embodiment of the present disclosure.
Figure 7:
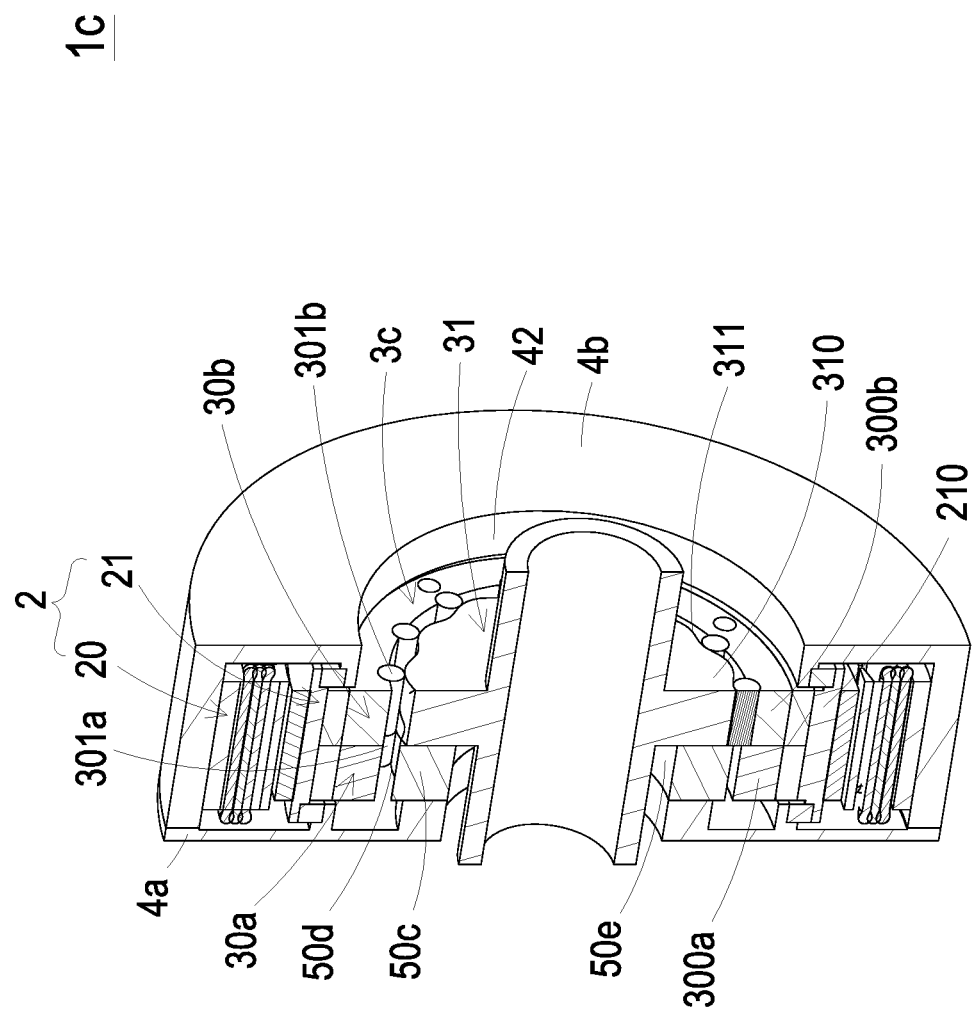
FIG. 7 is a schematic cutaway view illustrating the speed reducing device according to the third embodiment of the present disclosure.

Please refer to FIGS. 6 and 7. FIG. 6 is a schematic exploded view illustrating a speed reducing device having a power source according to a third embodiment of the present disclosure. FIG. 7 is a schematic cutaway view illustrating the speed reducing device according to the third embodiment of the present disclosure. In this embodiment, the speed reducing device 1c is a two-stage cycloid reducer. The speed reducing device 1c comprises a motor 2 served as a power source, a speed reducing mechanism 3c, a first fixing disc 4a and a positioning assembly. The structure and operation of the motor 2 of this embodiment are similar to those of the first embodiment. Component parts and elements corresponding to those of the first embodiment are designated by identical numeral references, and detailed descriptions thereof are omitted.

At least a portion of the speed reducing mechanism 3c is located at the inner side of the motor 2 and accommodated within the hollow structure of the rotor casing assembly 210.

In an embodiment, the speed reducing mechanism 3c comprises a first roller assembly 30a, a second roller assembly 30b and a cycloid disc 31. The first roller assembly 30a is disposed within the ring-shaped inner wall of the rotor casing assembly 210. The first roller assembly 30a comprises a first wheel disc 300a and at least one first roller 301a. The first wheel disc 300a has a hollow portion. The at least one first roller 301a is disposed on an inner wall of the first wheel disc 300a. While the rotor portion 21 is rotated relative to the stator portion 20, the first roller assembly 30a is rotated with the rotor portion 21. Due to the eccentricity between the ring-shaped inner wall and the ring-shaped outer wall of the rotor casing assembly 210, the first roller assembly 30a is eccentrically revolved about the center of the ring-shaped outer wall of the rotor casing assembly 210. The second roller assembly 30b is disposed beside the first roller assembly 30a and disposed within the ring-shaped inner wall of the rotor casing assembly 210. Moreover, the second roller assembly 30b is connected and linked with the first roller assembly 30a. That is, the first roller assembly 30a and the second roller assembly 30b are synchronously rotated along the same direction. The second roller assembly 30b comprises a second wheel disc 300b and at least one second roller 301b. The second wheel disc 300b has a hollow portion. The at least one second roller 301b is disposed on an inner wall of the second wheel disc 300b. While the rotor portion 21 is rotated relative to the stator portion 20, the second roller assembly 30b is rotated with the rotor portion 21. Due to the eccentricity between the ring-shaped inner wall and the ring-shaped outer wall of the rotor casing assembly 210, the second roller assembly 30b is eccentrically revolved about the center of the ring-shaped outer wall of the rotor casing assembly 210. Moreover, while the first roller assembly 30a and the second roller assembly 30b are rotated, no phase difference is generated.

At least a portion of the cycloid disc 31 is disposed within the hollow portion of the second wheel disc 300b of the second roller assembly 30b. The cycloid disc 31 comprises a main body 310 and at least one cycloid tooth structure 311. The at least one cycloid tooth structure 311 is protruded from an outer periphery of the main body 310 and in contact with the corresponding second roller 301b. While the second roller assembly 30b is rotated with the rotor portion 21 and the second roller assembly 30b is eccentrically revolved about the center of the ring-shaped outer wall of the rotor casing assembly 210, the at least one cycloid tooth structure 311 is pushed against the corresponding second roller 301b. Consequently, the cycloid disc 31 is correspondingly rotated.

In this embodiment, the first fixing disc 4a is connected with the stator portion 20. The first fixing disc 4a is located at a first outer side of the speed reducing mechanism 3c and disposed beside the first roller assembly 30a. The first fixing disc 4a is stationary and not rotatable.

In an embodiment, the positioning assembly comprises a fixed tooth wheel 50c. The fixed tooth wheel 50c is disposed within the hollow portion of the first wheel disc 300a of the first roller assembly 30a. The fixed tooth wheel 50c is disposed between the first fixing disc 4a and the first roller assembly 30a. The fixed tooth wheel 50c is fixedly connected with the first fixing disc 4a. Moreover, the fixed tooth wheel 50c comprises at least one fixed tooth structure 50d. The at least one fixed tooth structure 50d is protruded from an outer periphery of the fixed tooth wheel 50c and in contact with the corresponding first roller 301a. As mentioned above, the fixed tooth wheel 50c is fixedly connected with the first fixing disc 4a. While the rotor portion 21 is rotated, the first roller assembly 30a is not rotated about its own axle (i.e., self-rotation) because the positioning assembly and the first fixing disc 4a are collaboratively formed as a fixing end.

The functions of the speed reducing device 1c are similar to those of the speed reducing devices 1a and 1b, and are not redundantly described herein.

For example, the number of the at least one first roller 301a of the first roller assembly 30a is A, the number of the at least one cycloid tooth structure 311 of the cycloid disc 31 is B, the number of the at least one second roller 301b of the second roller assembly 30b is C, and the number of the at least one fixed tooth structure 50d of the fixed tooth wheel 50c is D. Under this circumstance, the reduction ratio of the speed reducing device 1c is equal to $(A \times B)/[(A \times B)-(D \times C)]$, wherein A, B, C and D are positive integers. Moreover, the rotor portion 21 of the motor 2 is a power input terminal of the speed reducing device 1c, and the cycloid disc 31 is a power output terminal of the speed reducing device 1c.

In some embodiments, the speed reducing device 1c further comprises a second fixing disc 4b. The second fixing disc 4b is connected with the stator portion 20. At least a portion of the second fixing disc 4b is located at a second outer side of the speed reducing mechanism 3c and disposed beside the second roller assembly 30b. The first outer side and the second outer side of the speed reducing mechanism 3c are opposed to each other. The second fixing disc 4b is stationary and not rotatable. The speed reducing mechanism 3c is covered by the first fixing disc 4a, the second fixing disc 4b and the motor 2 collaboratively.

In some embodiments, the first fixing disc 4a and the second fixing disc 4b comprise corresponding central openings 42, and the fixed tooth wheel 50c further comprises a central opening 50e. The cycloid disc 31 comprises an output shaft 312. The output shaft 312 runs through a middle region of the main body 310 of the cycloid disc 31. A first end of the output shaft 312 is penetrated through the central opening 42 of the first fixing disc 4a and the central opening 50e of the fixed tooth wheel 50c. A second end of the output shaft 312 is penetrated through the central opening 42 of the second fixing disc 4b. Consequently, the output shaft 312 may be served as the power output terminal of the speed reducing device 1c.

Figure 8:
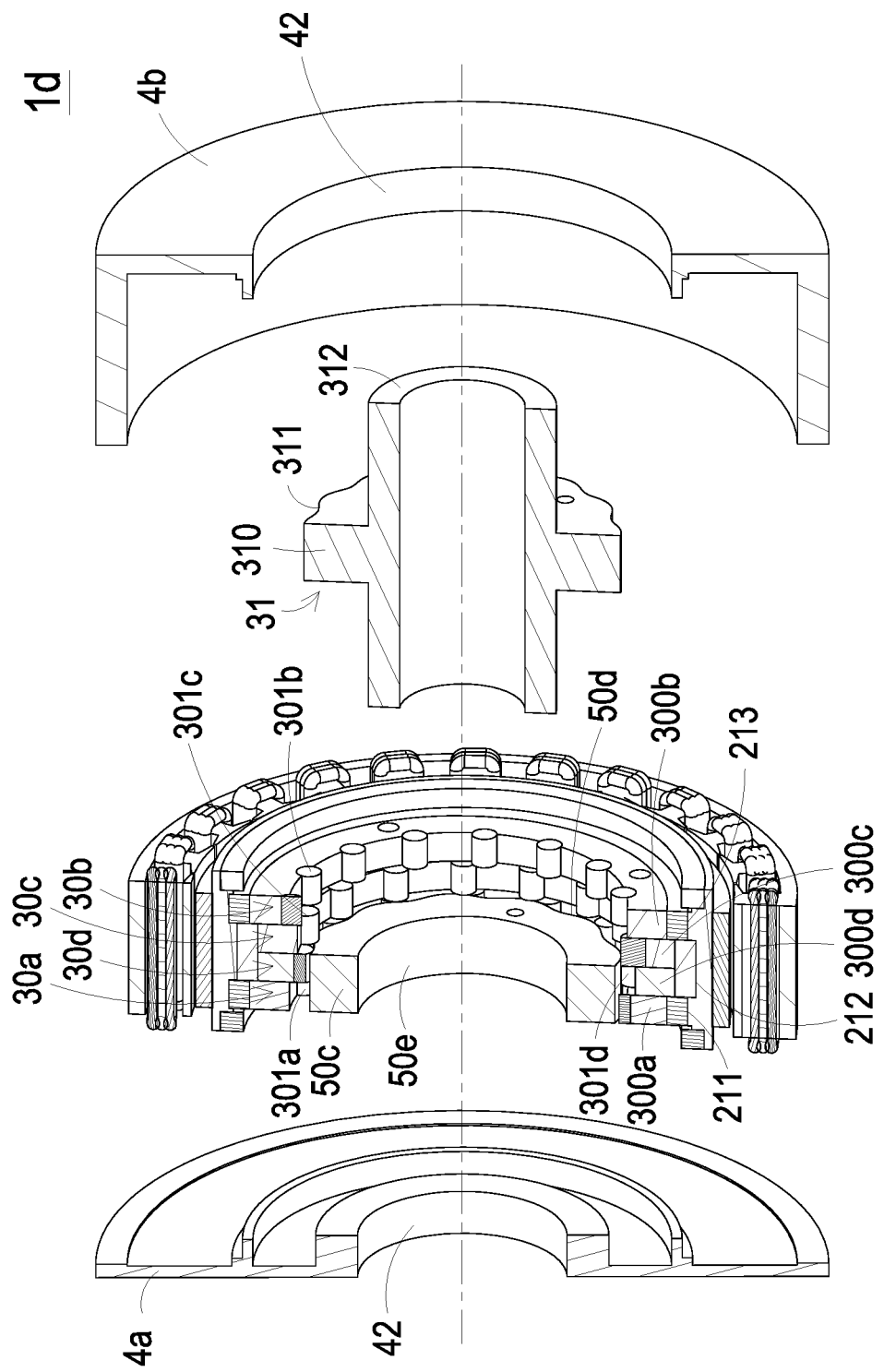
FIG. 8 is a schematic exploded view illustrating a speed reducing device having a power source according to a fourth embodiment of the present disclosure.
Figure 9:
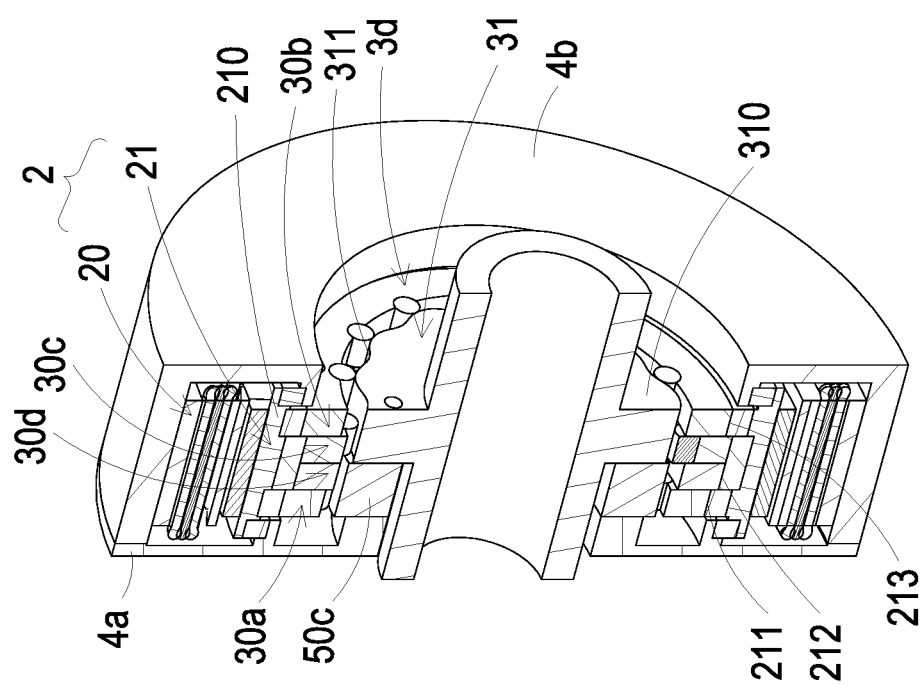
FIG. 9 is a schematic cutaway view illustrating the speed reducing device according to the fourth embodiment of the present disclosure.

Please refer to FIGS. 8 and 9. FIG. 8 is a schematic exploded view illustrating a speed reducing device having a power source according to a fourth embodiment of the present disclosure. FIG. 9 is a schematic cutaway view illustrating the speed reducing device according to the fourth embodiment of the present disclosure. In this embodiment, the speed reducing device 1d is a two-stage cycloid reducer. The speed reducing device 1d comprises a motor 2 served as a power source, a speed reducing mechanism 3d, a first fixing disc 4a and a positioning assembly. The structure and operation of the motor 2 of this embodiment are similar to those of the motor 2 of the second embodiment as shown in FIG. 4. Component parts and elements corresponding to those of the second embodiment are designated by identical numeral references, and detailed descriptions thereof are omitted.

In comparison with the first embodiment, the rotor casing assembly 210 of the rotor portion 21 of the motor 2 in this embodiment further comprises a first eccentric ring 211, a second eccentric ring 212 and a third eccentric ring 213. The first eccentric ring 211, the second eccentric ring 212 and the third eccentric ring 213 are disposed on the ring-shaped inner wall of the rotor casing assembly 210. The second eccentric ring 212 is disposed between the first eccentric ring 211 and the third eccentric ring 213. The eccentric directions of the first eccentric ring 211 and the third eccentric ring 213 are identical but opposite to the eccentric direction of the second eccentric ring 212.

At least a portion of the speed reducing mechanism 3d is located at the inner side of the motor 2 and accommodated within the hollow structure of the rotor casing assembly 210. In an embodiment, the speed reducing mechanism 3d comprises a first roller assembly 30a, a second roller assembly 30b, a third roller assembly 30c, a fourth roller assembly 30d and a cycloid disc 31. The first roller assembly 30a is disposed within the first eccentric ring 211 and located at a first outer side of the speed reducing mechanism 3d. The first roller assembly 30a comprises a first wheel disc 300a and at least one first roller 301a. The first wheel disc 300a has a hollow portion. The at least one first roller 301a is disposed on an inner wall of the first wheel disc 300a. The second roller assembly 30b is disposed within the third eccentric ring 213 and located at a second outer side of the speed reducing mechanism 3d. The second roller assembly 30b comprises a second wheel disc 300b and at least one second roller 301b. The second wheel disc 300b has a hollow portion. The at least one second roller 301b is disposed on an inner wall of the second wheel disc 300b. Moreover, the second roller assembly 30b is connected and linked with the first roller assembly 30a. That is, the first roller assembly 30a and the second roller assembly 30b are synchronously rotated along the same direction. As mentioned above, the first roller assembly 30a is disposed within the first eccentric ring 211, the second roller assembly 30b is disposed within the third eccentric ring 213, and the eccentric directions of the first eccentric ring 211 and the third eccentric ring 213 are identical. Consequently, while the first roller assembly 30a and the second roller assembly 30b are rotated, no phase difference is generated. The number of the at least one first roller 301a and the number of the at least one second roller 301b are equal.

The third roller assembly 30c is disposed within the second eccentric ring 212, and disposed between the fourth roller assembly 30d and the second roller assembly 30b. The third roller assembly 30c comprises a third wheel disc 300c and at least one third roller 301c. The third wheel disc 300c has a hollow portion. The at least one third roller 301c is disposed on an inner wall of the third wheel disc 300c. The fourth roller assembly 30d is disposed within the second eccentric ring 212, and disposed between the first roller assembly 30a and the third roller assembly 30c. The fourth roller assembly 30d comprises a fourth wheel disc 300d and at least one fourth roller 301d. The fourth wheel disc 300d has a hollow portion. The at least one fourth roller 301d is disposed on an inner wall of the fourth wheel disc 300d. Moreover, the third roller assembly 30c is connected and linked with the fourth roller assembly 30d. That is, the third roller assembly 30c and the fourth roller assembly 30d are synchronously rotated along the same direction. In this embodiment, both of the third roller assembly 30c and the fourth roller assembly 30d are disposed within the second eccentric ring 212. Consequently, while the third roller assembly 30c and the fourth roller assembly 30d are rotated, no phase difference is generated. The number of the at least one third roller 301c and the number of the at least one fourth roller 301d are equal.

A first portion of the cycloid disc 31 is disposed within the hollow portion of the second wheel disc 300b of the second roller assembly 30b. A second portion of the cycloid disc 31 is disposed within the hollow portion of the third wheel disc 300c of the third roller assembly 30c. The cycloid disc 31 comprises a main body 310 and at least one cycloid tooth structure 311. The at least one cycloid tooth structure 311 is protruded from an outer periphery of the main body 310 and in contact with the corresponding second roller 301b and the corresponding third roller 301c. While the second roller assembly 30b and the third roller assembly 30c are rotated with the rotor portion 21 and eccentrically revolved, the at least one cycloid tooth structure 311 of the cycloid disc 31 is pushed against the corresponding second roller 301b and the corresponding third roller 301c. Consequently, the cycloid disc 31 is correspondingly rotated.

In this embodiment, the first fixing disc 4a is connected with the stator portion 20. The first fixing disc 4a is located at a first outer side of the speed reducing mechanism 3d and disposed beside the first roller assembly 30a. The first fixing disc 4a is stationary and not rotatable.

In an embodiment, the positioning assembly comprises a fixed tooth wheel 50c. A first portion of the fixed tooth wheel 50c is disposed within the hollow portion of the first wheel disc 300a of the first roller assembly 30a. A second portion of the fixed tooth wheel 50c is disposed within the hollow portion of the fourth wheel disc 300d of the fourth roller assembly 30d. The fixed tooth wheel 50c is disposed between the first fixing disc 4a and the cycloid disc 31. The fixed tooth wheel 50c is fixedly connected with the first fixing disc 4a. Moreover, the fixed tooth wheel 50c comprises at least one fixed tooth structure 50d. The at least one fixed tooth structure 50d is protruded from an outer periphery of the fixed tooth wheel 50c and in contact with the corresponding first roller 301a and the corresponding fourth roller 301d. As mentioned above, the fixed tooth wheel 50c is fixedly connected with the first fixing disc 4a. While the rotor portion 21 is rotated, the first roller assembly 30a and the fourth roller assembly 30d are not rotated about their own axle (i.e., self-rotation) because the positioning assembly and the first fixing disc 4a are collaboratively formed as a fixing end.

The functions of the speed reducing device 1d are similar to those of the speed reducing devices 1a and 1b, and are not redundantly described herein.

For example, the number of the at least one first roller 301a of the first roller assembly 30a is A, the number of the at least one cycloid tooth structure 311 of the cycloid disc 31 is B, the number of the at least one third roller 301c of the third roller assembly 30c is C, and the number of the at least one fixed tooth structure 50d of the fixed tooth wheel 50c is D. Under this circumstance, the reduction ratio of the speed reducing device 1d is equal to $(A \times B)/[(A \times B)-(D \times C)]$, wherein A, B, C and D are positive integers. Moreover, the rotor portion 21 of the motor 2 is a power input terminal of the speed reducing device 1d, and the cycloid disc 31 is a power output terminal of the speed reducing device 1d.

In some embodiments, the speed reducing device 1d further comprises a second fixing disc 4b. The second fixing disc 4b is connected with the stator portion 20. At least a portion of the second fixing disc 4b is located at a second outer side of the speed reducing mechanism 3d and disposed beside the second roller assembly 30b. The first outer side and the second outer side of the speed reducing mechanism 3d are opposed to each other. The second fixing disc 4b is stationary and not rotatable. The speed reducing mechanism 3d is covered by the first fixing disc 4a, the second fixing disc 4b and the motor 2 collaboratively.

In some embodiments, the first fixing disc 4a and the second fixing disc 4b comprise corresponding central openings 42, and the fixed tooth wheel 50c further comprises a central opening 50e. The cycloid disc 31 comprises an output shaft 312. The output shaft 312 runs through a middle region of the main body 310 of the cycloid disc 31. A first end of the output shaft 312 is penetrated through the central opening 42 of the first fixing disc 4a and the central opening 50e of the fixed tooth wheel 50c. A second end of the output shaft 312 is penetrated through the central opening 42 of the second fixing disc 4b. Consequently, the output shaft 312 may be served as the power output terminal of the speed reducing device 1d.

Figure 10:
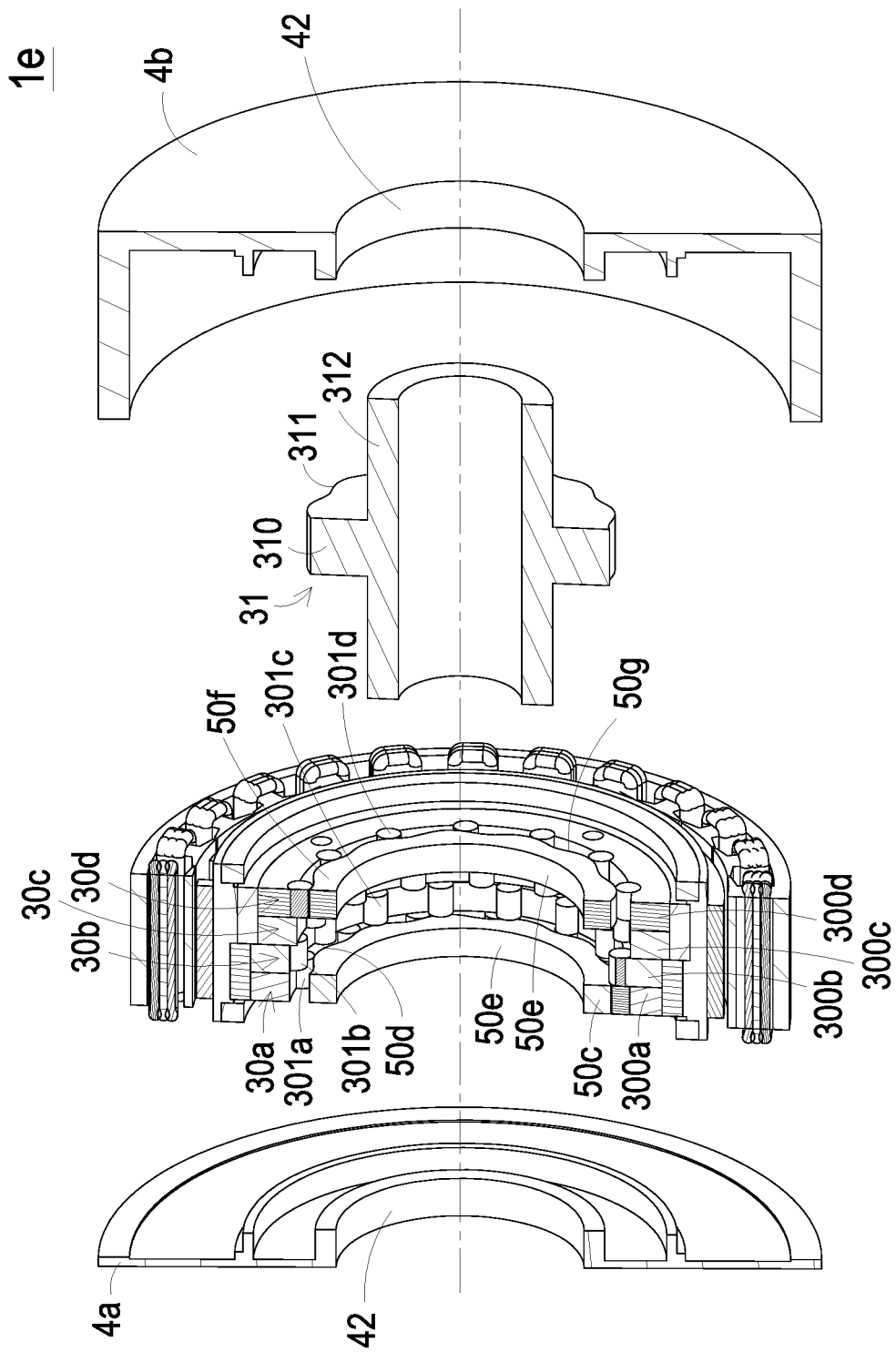
FIG. 10 is a schematic exploded view illustrating a speed reducing device having a power source according to a fifth embodiment of the present disclosure.
Figure 11:
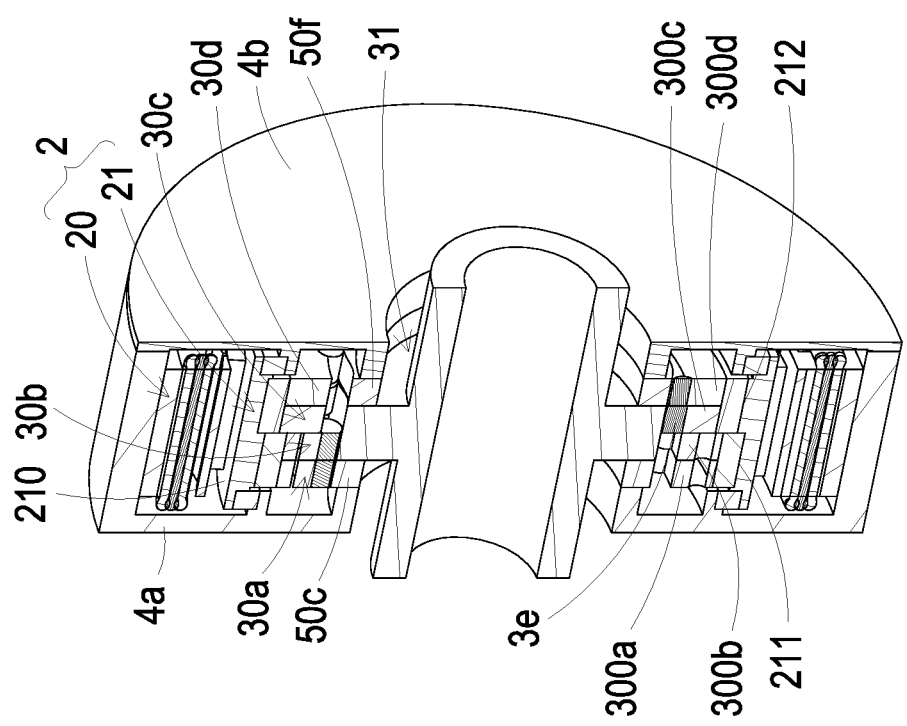
FIG. 11 is a schematic cutaway view illustrating the speed reducing device according to the fifth embodiment of the present disclosure.

Please refer to FIGS. 10 and 11. FIG. 10 is a schematic exploded view illustrating a speed reducing device having a power source according to a fifth embodiment of the present disclosure. FIG. 11 is a schematic cutaway view illustrating the speed reducing device according to the fifth embodiment of the present disclosure. In this embodiment, the speed reducing device 1e is a two-stage cycloid reducer. The speed reducing device 1e comprises a motor 2 served as a power source, a speed reducing mechanism 3e, a first fixing disc 4a, a second fixing disc 4b and a positioning assembly. The structure and operation of the motor 2 of this embodiment are similar to those of the motor 2 of the second embodiment as shown in FIG. 4. Component parts and elements corresponding to those of the second embodiment are designated by identical numeral references, and detailed descriptions thereof are omitted.

At least a portion of the speed reducing mechanism 3e is located at the inner side of the motor 2 and accommodated within the hollow structure of the rotor casing assembly 210. In an embodiment, the speed reducing mechanism 3e comprises a first roller assembly 30a, a second roller assembly 30b, a third roller assembly 30c, a fourth roller assembly 30d and a cycloid disc 31. The first roller assembly 30a is disposed within the first eccentric ring 211 and located at a first outer side of the speed reducing mechanism 3e. The first roller assembly 30a comprises a first wheel disc 300a and at least one first roller 301a. The first wheel disc 300a has a hollow portion. The at least one first roller 301a is disposed on an inner wall of the first wheel disc 300a. The second roller assembly 30b is located beside first roller assembly 30a and disposed within the first eccentric ring 211. Moreover, the second roller assembly 30b is disposed between the first roller assembly 30a and the third roller assembly 30c. The second roller assembly 30b comprises a second wheel disc 300b and at least one second roller 301b. The second wheel disc 300b has a hollow portion. The at least one second roller 301b is disposed on an inner wall of the second wheel disc 300b. Moreover, the second roller assembly 30b is connected and linked with the first roller assembly 30a. That is, the first roller assembly 30a and the second roller assembly 30b are synchronously rotated along the same direction. As mentioned above, the first roller assembly 30a and the second roller assembly 30b are disposed within the first eccentric ring 211. Consequently, while the first roller assembly 30a and the second roller assembly 30b are rotated, no phase difference is generated. Moreover, the number of the at least one first roller 301a and the number of the at least one second roller 301b are equal.

The third roller assembly 30c is disposed within the second eccentric ring 212, and disposed between the second roller assembly 30b and the fourth roller assembly 30d. The third roller assembly 30c comprises a third wheel disc 300c and at least one third roller 301c. The third wheel disc 300c has a hollow portion. The at least one third roller 301c is disposed on an inner wall of the third wheel disc 300c. The fourth roller assembly 30d is disposed within the second eccentric ring 212, and located at a second outer side of the speed reducing mechanism 3e. The first outer side and the second outer side of the speed reducing mechanism 3e are opposed to each other. The fourth roller assembly 30d comprises a fourth wheel disc 300d and at least one fourth roller 301d. The fourth wheel disc 300d has a hollow portion. The at least one fourth roller 301d is disposed on an inner wall of the fourth wheel disc 300d. Moreover, the third roller assembly 30c is connected and linked with the fourth roller assembly 30d. That is, the third roller assembly 30c and the fourth roller assembly 30d are synchronously rotated along the same direction. In this embodiment, both of the third roller assembly 30c and the fourth roller assembly 30d are disposed within the second eccentric ring 212. Consequently, while the third roller assembly 30c and the fourth roller assembly 30d are rotated, no phase difference is generated. Moreover, the number of the at least one third roller 301c and the number of the at least one fourth roller 301d are equal.

A first portion of the cycloid disc 31 is disposed within the hollow portion of the second wheel disc 300b of the second roller assembly 30b. A second portion of the cycloid disc 31 is disposed within the hollow portion of the third wheel disc 300c of the third roller assembly 30c. The cycloid disc 31 comprises a main body 310 and at least one cycloid tooth structure 311. The at least one cycloid tooth structure 311 is protruded from an outer periphery of the main body 310 and in contact with the corresponding second roller 301b and the corresponding third roller 301c. While the second roller assembly 30b and the third roller assembly 30c are rotated with the rotor portion 21 and eccentrically revolved, the at least one cycloid tooth structure 311 of the cycloid disc 31 is pushed against the corresponding second roller 301b and the corresponding third roller 301c. Consequently, the cycloid disc 31 is correspondingly rotated.

In this embodiment, the first fixing disc 4a is connected with the stator portion 20. The first fixing disc 4a is located at a first outer side of the speed reducing mechanism 3e and disposed beside the first roller assembly 30a. The first fixing disc 4a is stationary and not rotatable. The second fixing disc 4b is connected with the stator portion 20. At least a portion of the second fixing disc 4b is located at a second outer side of the speed reducing mechanism 3e and disposed beside the fourth roller assembly 30d. The first outer side and the second outer side of the speed reducing mechanism 3e are opposed to each other. The second fixing disc 4b is stationary and not rotatable.

In an embodiment, the positioning assembly comprises a first fixed tooth wheel 50c and a second fixed tooth wheel 50f. The first fixed tooth wheel 50c is disposed within the hollow portion of the first wheel disc 300a of the first roller assembly 30a. Moreover, the first fixed tooth wheel 50c is disposed between the first fixing disc 4a and the cycloid disc 31. The first fixed tooth wheel 50c is fixedly connected with the first fixing disc 4a. Moreover, the first fixed tooth wheel 50c comprises at least one fixed tooth structure 50d. The at least one fixed tooth structure 50d is protruded from an outer periphery of the first fixed tooth wheel 50c and in contact with the corresponding first roller 301a. The second fixed tooth wheel 50f is disposed within the hollow portion of the fourth wheel disc 300d of the fourth roller assembly 30d. Moreover, the second fixed tooth wheel 50f is disposed between the second fixing disc 4b and the cycloid disc 31. The second fixed tooth wheel 50f is fixedly connected with the second fixing disc 4b. Moreover, the second fixed tooth wheel 50f comprises at least one fixed tooth structure 50g. The at least one fixed tooth structure 50g is protruded from an outer periphery of the second fixed tooth wheel 50f and in contact with the corresponding fourth roller 301d. As mentioned above, the fixed tooth wheel 50c is fixedly connected with the first fixing disc 4a, and the second fixed tooth wheel 50f is fixedly connected with the second fixing disc 4b. While the rotor portion 21 is rotated, the first roller assembly 30a and the fourth roller assembly 30d are not rotated about their own axles (i.e., self-rotation) because the positioning assembly, the first fixing disc 4a and the second fixing disc 4b are collaboratively formed as a fixing end.

The functions of the speed reducing device 1e are similar to those of the speed reducing devices 1a and 1b, and are not redundantly described herein.

For example, the number of the at least one first roller 301a of the first roller assembly 30a is A, the number of the at least one cycloid tooth structure 311 of the cycloid disc 31 is B, the number of the at least one second roller 301b of the second roller assembly 30b is C, and the number of the at least one fixed tooth structure 50d of the first fixed tooth wheel 50c is D. Under this circumstance, the reduction ratio of the speed reducing device 1e is equal to $(A \times B)/[(A \times B)-(D \times C)]$, wherein A, B, C and D are positive integers. Moreover, the rotor portion 21 of the motor 2 is a power input terminal of the speed reducing device 1e, and the cycloid disc 31 is a power output terminal of the speed reducing device 1e.

In some embodiments, the first fixing disc 4a and the second fixing disc 4b comprise corresponding central openings 42, and the first fixed tooth wheel 50c and the second fixed tooth wheel 50f further comprises corresponding central openings 50e. The cycloid disc 31 comprises an output shaft 312. The output shaft 312 runs through a middle region of the main body 310 of the cycloid disc 31. A first end of the output shaft 312 is penetrated through the central opening 42 of the first fixing disc 4a and the central opening 50e of the first fixed tooth wheel 50c. A second end of the output shaft 312 is penetrated through the central opening 42 of the second fixing disc 4b and the central opening 50e of the second fixed tooth wheel 50f. Consequently, the output shaft 312 may be served as the power output terminal of the speed reducing device 1e.

Figure 12:
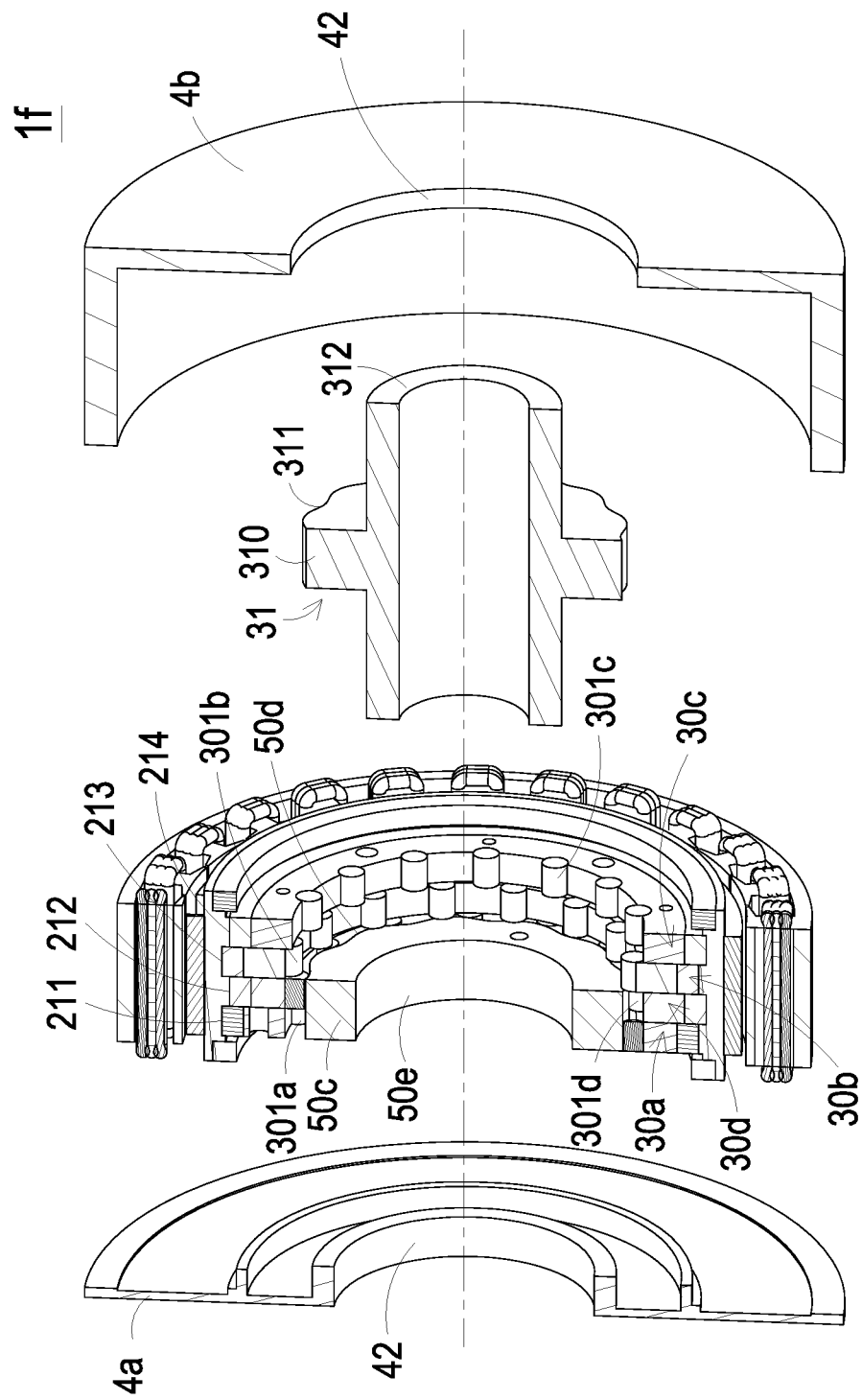
FIG. 12 is a schematic exploded view illustrating a speed reducing device having a power source according to a sixth embodiment of the present disclosure.
Figure 13:
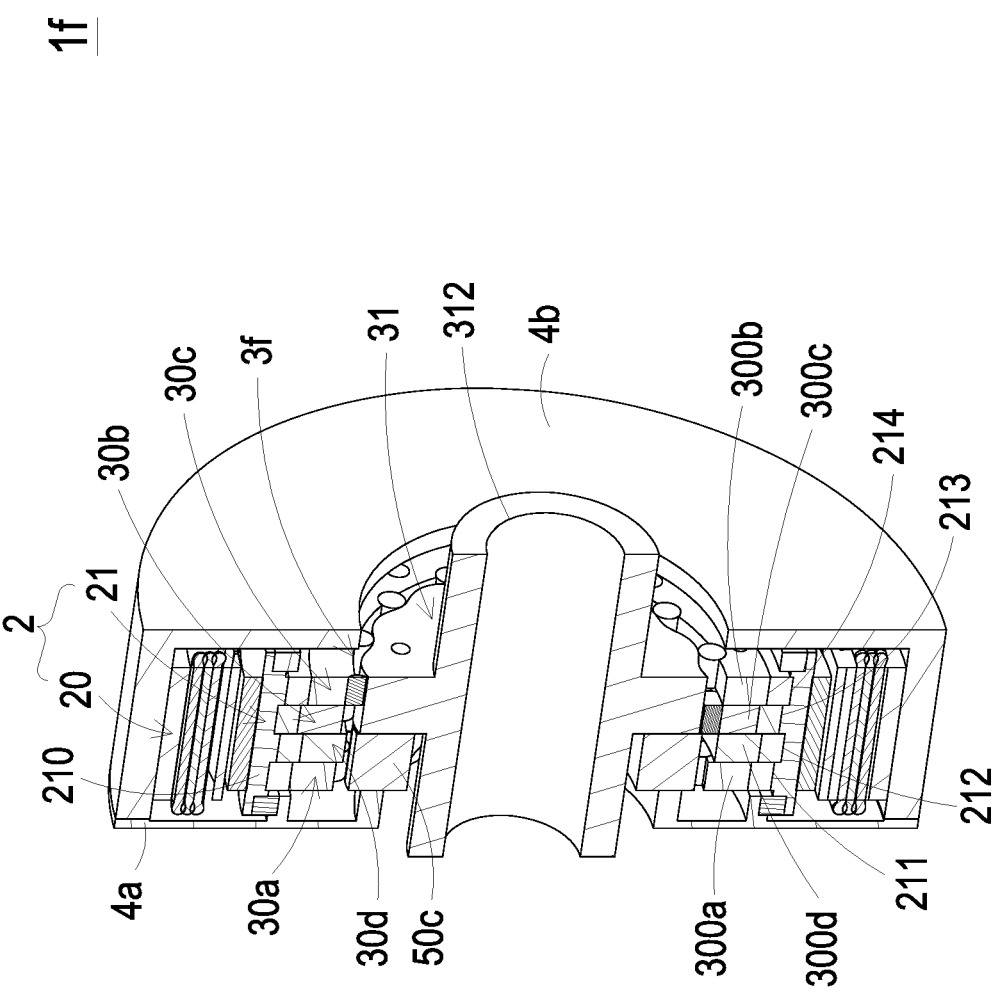
FIG. 13 is a schematic cutaway view illustrating the speed reducing device according to the sixth embodiment of the present disclosure.

Please refer to FIGS. 12 and 13. FIG. 12 is a schematic exploded view illustrating a speed reducing device having a power source according to a sixth embodiment of the present disclosure. FIG. 13 is a schematic cutaway view illustrating the speed reducing device according to the sixth embodiment of the present disclosure. In this embodiment, the speed reducing device 1f is a two-stage cycloid reducer. The speed reducing device 1f comprises a motor 2 served as a power source, a speed reducing mechanism 3f, a first fixing disc 4a and a positioning assembly. The structure and operation of the motor 2 of this embodiment are similar to those of the motor 2 of the second embodiment as shown in FIG. 4. Component parts and elements corresponding to those of the second embodiment are designated by identical numeral references, and detailed descriptions thereof are omitted.

In comparison with the first embodiment, the rotor casing assembly 210 of the rotor portion 21 of the motor 2 in this embodiment further comprises a first eccentric ring 211, a second eccentric ring 212, a third eccentric ring 213 and a fourth eccentric ring 214. The first eccentric ring 211, the second eccentric ring 212, the third eccentric ring 213 and the fourth eccentric ring 214 are disposed on the ring-shaped inner wall of the rotor casing assembly 210. The second eccentric ring 212 is disposed between the first eccentric ring 211 and the third eccentric ring 213. The third eccentric ring 213 is disposed between the second eccentric ring 212 and the fourth eccentric ring 214. The eccentric directions of the first eccentric ring 211 and the third eccentric ring 213 are identical. The eccentric directions of the second eccentric ring 212 and the fourth eccentric ring 214 are identical. The eccentric direction of the first eccentric ring 211 and the third eccentric ring 213 and the eccentric direction of the second eccentric ring 212 and the fourth eccentric ring 214 are opposite.

At least a portion of the speed reducing mechanism 3f is located at the inner side of the motor 2 and accommodated within the hollow structure of the rotor casing assembly 210. In an embodiment, the speed reducing mechanism 3f comprises a first roller assembly 30a, a second roller assembly 30b, a third roller assembly 30c, a fourth roller assembly 30d and a cycloid disc 31. The first roller assembly 30a is disposed within the first eccentric ring 211 and located at a first outer side of the speed reducing mechanism 3f. The first roller assembly 30a comprises a first wheel disc 300a and at least one first roller 301a. The first wheel disc 300a has a hollow portion. The at least one first roller 301a is disposed on an inner wall of the first wheel disc 300a. The second roller assembly 30b is disposed within the third eccentric ring 213, and disposed between the third roller assembly 30c and the fourth roller assembly 30d. The second roller assembly 30b comprises a second wheel disc 300b and at least one second roller 301b. The second wheel disc 300b has a hollow portion. The at least one second roller 301b is disposed on an inner wall of the second wheel disc 300b. Moreover, the second roller assembly 30b is connected and linked with the first roller assembly 30a. That is, the first roller assembly 30a and the second roller assembly 30b are synchronously rotated along the same direction. As mentioned above, the first roller assembly 30a is disposed within the first eccentric ring 211, the second roller assembly 30b is disposed within the third eccentric ring 213, and the eccentric directions of the first eccentric ring 211 and the third eccentric ring 213 are identical. Consequently, while the first roller assembly 30a and the second roller assembly 30b are rotated, no phase difference is generated. Moreover, the number of the at least one first roller 301a and the number of the at least one second roller 301b are equal.

The third roller assembly 30c is disposed within the fourth eccentric ring 214, and located at a second outer side of the speed reducing mechanism 3f. The first outer side and the second outer side of the speed reducing mechanism 3f are opposed to each other. The third roller assembly 30c comprises a third wheel disc 300c and at least one third roller 301c. The third wheel disc 300c has a hollow portion. The at least one third roller 301c is disposed on an inner wall of the third wheel disc 300c. The fourth roller assembly 30d is disposed within the second eccentric ring 212, and disposed between the first roller assembly 30a and the second roller assembly 30b. The fourth roller assembly 30d comprises a fourth wheel disc 300d and at least one fourth roller 301d. The fourth wheel disc 300d has a hollow portion. The at least one fourth roller 301d is disposed on an inner wall of the fourth wheel disc 300d. Moreover, the third roller assembly 30c is connected and linked with the fourth roller assembly 30d. That is, the third roller assembly 30c and the fourth roller assembly 30d are synchronously rotated along the same direction. As mentioned above, third roller assembly 30c is disposed within the fourth eccentric ring 214, the fourth roller assembly 30d is disposed within the second eccentric ring 212, the fourth roller assembly 30d is disposed between the first roller assembly 30a and the second roller assembly 30b, and the eccentric directions of the second eccentric ring 212 and the fourth eccentric ring 214 are identical. Consequently, while the third roller assembly 30c and the fourth roller assembly 30d are rotated, no phase difference is generated. Moreover, the number of the at least one third roller 301c and the number of the at least one fourth roller 301d are equal.

A first portion of the cycloid disc 31 is disposed within the hollow portion of the second wheel disc 300b of the second roller assembly 30b. A second portion of the cycloid disc 31 is disposed within the hollow portion of the third wheel disc 300c of the third roller assembly 30c. The cycloid disc 31 comprises a main body 310 and at least one cycloid tooth structure 311. The at least one cycloid tooth structure 311 is protruded from an outer periphery of the main body 310 and in contact with the corresponding second roller 301b and the corresponding third roller 301c. While the second roller assembly 30b and the third roller assembly 30c are rotated with the rotor portion 21 and eccentrically revolved, the at least one cycloid tooth structure 311 of the cycloid disc 31 is pushed against the corresponding second roller 301b and the corresponding third roller 301c. Consequently, the cycloid disc 31 is correspondingly rotated.

In this embodiment, the first fixing disc 4a is connected with the stator portion 20. The first fixing disc 4a is located at a first outer side of the speed reducing mechanism 3f and disposed beside the first roller assembly 30a. The first fixing disc 4a is stationary and not rotatable.

In an embodiment, the positioning assembly comprises a fixed tooth wheel 50c. A first portion of the fixed tooth wheel 50c is disposed within the hollow portion of the first wheel disc 300a of the first roller assembly 30a. A second portion of the fixed tooth wheel 50c is disposed within the hollow portion of the fourth wheel disc 300d of the fourth roller assembly 30d. The fixed tooth wheel 50c is disposed between the first fixing disc 4a and the cycloid disc 31. The fixed tooth wheel 50c is fixedly connected with the first fixing disc 4a. Moreover, the fixed tooth wheel 50c comprises at least one fixed tooth structure 50d. The at least one fixed tooth structure 50d is protruded from an outer periphery of the fixed tooth wheel 50c and in contact with the corresponding first roller 301a and the corresponding fourth roller 301d. As mentioned above, the fixed tooth wheel 50c is fixedly connected with the first fixing disc 4a. While the rotor portion 21 is rotated, the first roller assembly 30a and the fourth roller assembly 30d are not rotated about their own axles (i.e., self-rotation) because the positioning assembly and the first fixing disc 4a are collaboratively formed as a fixing end.

The functions of the speed reducing device 1f are similar to those of the speed reducing devices 1a and 1b, and are not redundantly described herein.

For example, the number of the at least one first roller 301a of the first roller assembly 30a is A, the number of the at least one cycloid tooth structure 311 of the cycloid disc 31 is B, the number of the at least one second roller 301b of the second roller assembly 30b is C, and the number of the at least one fixed tooth structure 50d of the fixed tooth wheel 50c is D. Under this circumstance, the reduction ratio of the speed reducing device 1f is equal to $(A \times B)/[(A \times B)-(D \times C)]$, wherein A, B, C and D are positive integers. Moreover, the rotor portion 21 of the motor 2 is a power input terminal of the speed reducing device 1f, and the cycloid disc 31 is a power output terminal of the speed reducing device 1f.

In some embodiments, the speed reducing device 1f further comprises a second fixing disc 4b. The second fixing disc 4b is connected with the stator portion 20. At least a portion of the second fixing disc 4b is located at a second outer side of the speed reducing mechanism 3f and disposed beside the second roller assembly 30b. The first outer side and the second outer side of the speed reducing mechanism 3f are opposed to each other. The second fixing disc 4b is stationary and not rotatable. The speed reducing mechanism 3f is covered by the first fixing disc 4a, the second fixing disc 4b and the motor 2 collaboratively.

In some embodiments, the first fixing disc 4a and the second fixing disc 4b comprise corresponding central openings 42, and the fixed tooth wheel 50c further comprises a central opening 50e. The cycloid disc 31 comprises an output shaft 312. The output shaft 312 runs through a middle region of the main body 310 of the cycloid disc 31. A first end of the output shaft 312 is penetrated through the central opening 42 of the first fixing disc 4a and the central opening 50e of the fixed tooth wheel 50c. A second end of the output shaft 312 is penetrated through the central opening 42 of the second fixing disc 4b. Consequently, the output shaft 312 may be served as the power output terminal of the speed reducing device 1f.

Figure 14:
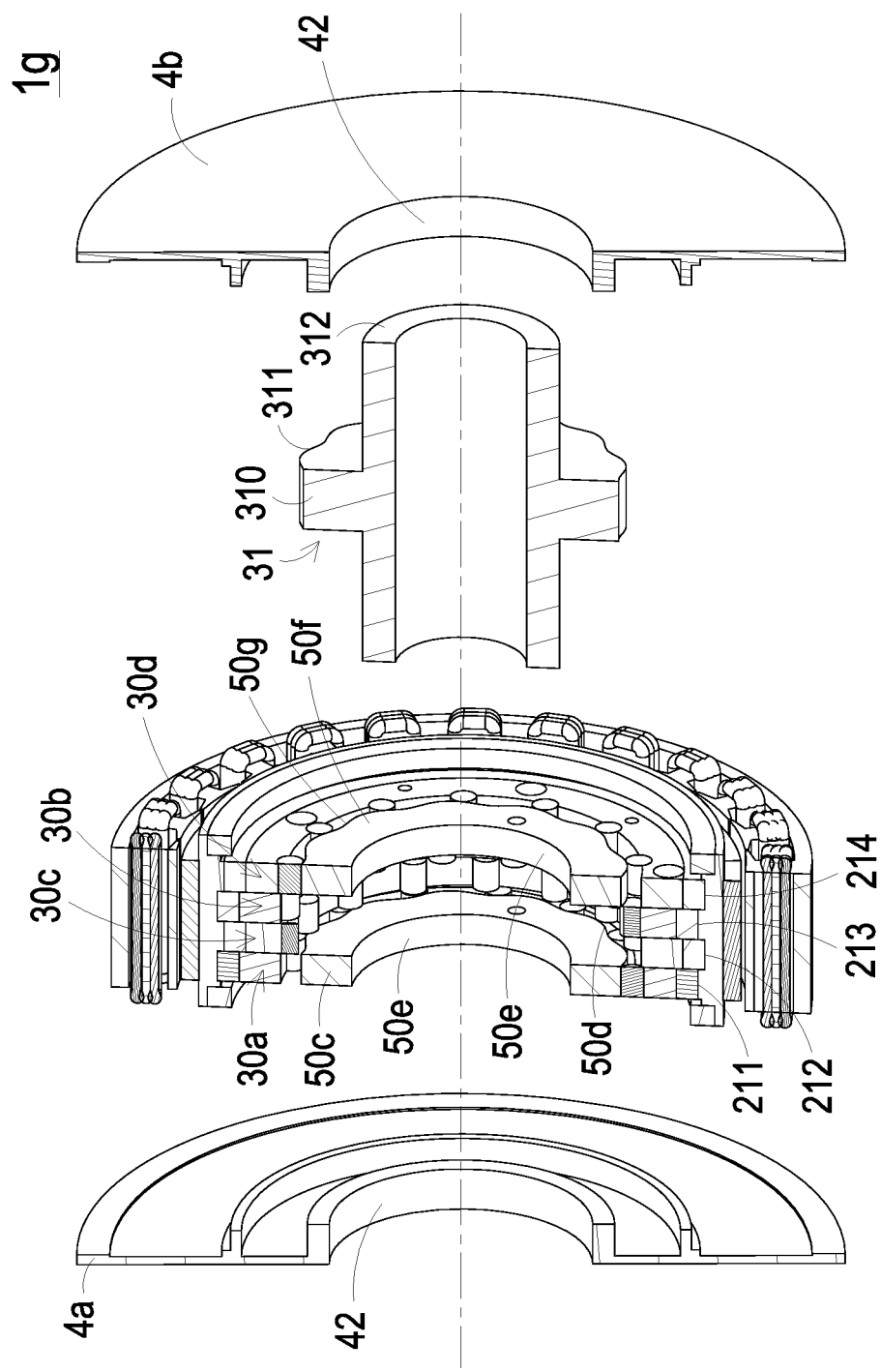
FIG. 14 is a schematic exploded view illustrating a speed reducing device having a power source according to a seventh embodiment of the present disclosure.
Figure 15:
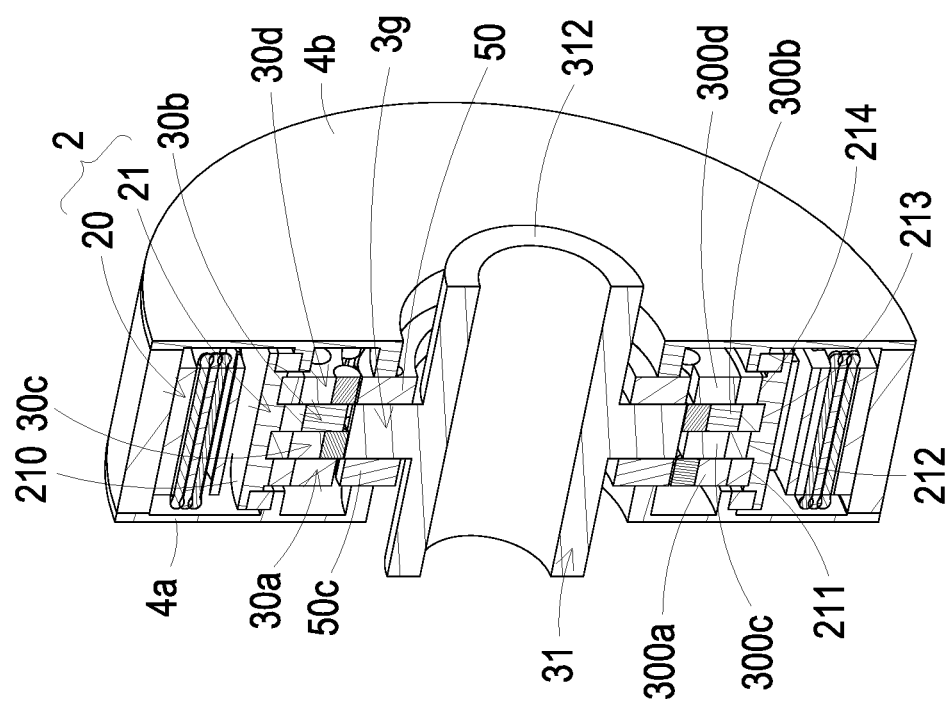
FIG. 15 is a schematic cutaway view illustrating the speed reducing device according to the seventh embodiment of the present disclosure.

Please refer to FIGS. 14 and 15. FIG. 14 is a schematic exploded view illustrating a speed reducing device having a power source according to a seventh embodiment of the present disclosure. FIG. 15 is a schematic cutaway view illustrating the speed reducing device according to the seventh embodiment of the present disclosure. In this embodiment, the speed reducing device 1g is a two-stage cycloid reducer. The speed reducing device 1g comprises a motor 2 served as a power source, a speed reducing mechanism 3g, a first fixing disc 4a, a second fixing disc 4b and a positioning assembly. The structure and operation of the motor 2 of this embodiment are similar to those of the motor 2 of the second embodiment as shown in FIG. 4. Component parts and elements corresponding to those of the second embodiment are designated by identical numeral references, and detailed descriptions thereof are omitted.

In comparison with the first embodiment, the rotor casing assembly 210 of the rotor portion 21 of the motor 2 in this embodiment further comprises a first eccentric ring 211, a second eccentric ring 212, a third eccentric ring 213 and a fourth eccentric ring 214. The first eccentric ring 211, the second eccentric ring 212, the third eccentric ring 213 and the fourth eccentric ring 214 are disposed on the ring-shaped inner wall of the rotor casing assembly 210. The second eccentric ring 212 is disposed between the first eccentric ring 211 and the third eccentric ring 213. The third eccentric ring 213 is disposed between the second eccentric ring 212 and the fourth eccentric ring 214. The eccentric directions of the first eccentric ring 211 and the third eccentric ring 213 are identical. The eccentric directions of the second eccentric ring 212 and the fourth eccentric ring 214 are identical. The eccentric direction of the first eccentric ring 211 and the third eccentric ring 213 and the eccentric direction of the second eccentric ring 212 and the fourth eccentric ring 214 are opposite.

At least a portion of the speed reducing mechanism 3g is located at the inner side of the motor 2 and accommodated within the hollow structure of the rotor casing assembly 210. In an embodiment, the speed reducing mechanism 3g comprises a first roller assembly 30a, a second roller assembly 30b, a third roller assembly 30c, a fourth roller assembly 30d and a cycloid disc 31. The first roller assembly 30a is disposed within the first eccentric ring 211 and located at a first outer side of the speed reducing mechanism 3g. The first roller assembly 30a comprises a first wheel disc 300a and at least one first roller 301a. The first wheel disc 300a has a hollow portion. The at least one first roller 301a is disposed on an inner wall of the first wheel disc 300a. The second roller assembly 30b is disposed within the third eccentric ring 213. Moreover, the second roller assembly 30b is disposed between the third roller assembly 30c and the fourth roller assembly 30d. The second roller assembly 30b comprises a second wheel disc 300b and at least one second roller 301b. The second wheel disc 300b has a hollow portion. The at least one second roller 301b is disposed on an inner wall of the second wheel disc 300b. Moreover, the second roller assembly 30b is connected and linked with the first roller assembly 30a. That is, the first roller assembly 30a and the second roller assembly 30b are synchronously rotated along the same direction. As mentioned above, the first roller assembly 30a is disposed within the first eccentric ring 211, the second roller assembly 30b is disposed within the third eccentric ring 213, and the eccentric directions of the first eccentric ring 211 and the third eccentric ring 213 are identical. Consequently, while the first roller assembly 30a and the second roller assembly 30b are rotated, no phase difference is generated. Moreover, the number of the at least one first roller 301a and the number of the at least one second roller 301b are equal.

The third roller assembly 30c is disposed within the second eccentric ring 212, and disposed between the first roller assembly 30a and the second roller assembly 30b. The third roller assembly 30c comprises a third wheel disc 300c and at least one third roller 301c. The third wheel disc 300c has a hollow portion. The at least one third roller 301c is disposed on an inner wall of the third wheel disc 300c. The fourth roller assembly 30d is disposed within the fourth eccentric ring 214, and located at a second outer side of the speed reducing mechanism 3f. The first outer side and the second outer side of the speed reducing mechanism 3f are opposed to each other. The fourth roller assembly 30d comprises a fourth wheel disc 300d and at least one fourth roller 301d. The fourth wheel disc 300d has a hollow portion. The at least one fourth roller 301d is disposed on an inner wall of the fourth wheel disc 300d. Moreover, the third roller assembly 30c is connected and linked with the fourth roller assembly 30d. That is, the third roller assembly 30c and the fourth roller assembly 30d are synchronously rotated along the same direction. As mentioned above, the third roller assembly 30c is disposed within the second eccentric ring 212, the fourth roller assembly 30d is disposed within the fourth eccentric ring 214, and the eccentric directions of the second eccentric ring 212 and the fourth eccentric ring 214 are identical. Consequently, while the third roller assembly 30c and the fourth roller assembly 30d are rotated, no phase difference is generated. Moreover, the number of the at least one third roller 301c and the number of the at least one fourth roller 301d are equal.

A first portion of the cycloid disc 31 is disposed within the hollow portion of the second wheel disc 300b of the second roller assembly 30b. A second portion of the cycloid disc 31 is disposed within the hollow portion of the third wheel disc 300c of the third roller assembly 30c. The cycloid disc 31 comprises a main body 310 and at least one cycloid tooth structure 311. The at least one cycloid tooth structure 311 is protruded from an outer periphery of the main body 310 and in contact with the corresponding second roller 301b and the corresponding third roller 301c. While the second roller assembly 30b and the third roller assembly 30c are rotated with the rotor portion 21 and eccentrically revolved, the at least one cycloid tooth structure 311 of the cycloid disc 31 is pushed against the corresponding second roller 301b and the corresponding third roller 301c. Consequently, the cycloid disc 31 is correspondingly rotated.

In this embodiment, the first fixing disc 4a is connected with the stator portion 20. The first fixing disc 4a is located at a first outer side of the speed reducing mechanism 3g and disposed beside the first roller assembly 30a. The first fixing disc 4a is stationary and not rotatable. The second fixing disc 4b is connected with the stator portion 20. At least a portion of the second fixing disc 4b is located at a second outer side of the speed reducing mechanism 3g and disposed beside the fourth roller assembly 30d. The first outer side and the second outer side of the speed reducing mechanism 3g are opposed to each other. The second fixing disc 4b is stationary and not rotatable.

In an embodiment, the positioning assembly comprises a first fixed tooth wheel 50c and a second fixed tooth wheel 50f. The first fixed tooth wheel 50c is disposed within the hollow portion of the first wheel disc 300a of the first roller assembly 30a. Moreover, the first fixed tooth wheel 50c is disposed between the first fixing disc 4a and the cycloid disc 31. The first fixed tooth wheel 50c is fixedly connected with the first fixing disc 4a. Moreover, the first fixed tooth wheel 50c comprises at least one fixed tooth structure 50d. The at least one fixed tooth structure 50d is protruded from an outer periphery of the first fixed tooth wheel 50c and in contact with the corresponding first roller 301a. The second fixed tooth wheel 50f is disposed within the hollow portion of the fourth wheel disc 300d of the fourth roller assembly 30d. Moreover, the second fixed tooth wheel 50f is disposed between the second fixing disc 4b and the cycloid disc 31. The second fixed tooth wheel 50f is fixedly connected with the second fixing disc 4b. Moreover, the second fixed tooth wheel 50f comprises at least one fixed tooth structure 50g. The at least one fixed tooth structure 50g is protruded from an outer periphery of the second fixed tooth wheel 50f and in contact with the corresponding fourth roller 301d. As mentioned above, the fixed tooth wheel 50c is fixedly connected with the first fixing disc 4a, and the second fixed tooth wheel 50f is fixedly connected with the second fixing disc 4b. While the rotor portion 21 is rotated, the first roller assembly 30a and the fourth roller assembly 30d are not rotated about their own axles (i.e., self-rotation) because the positioning assembly, the first fixing disc 4a and the second fixing disc 4b are collaboratively formed as a fixing end.

The functions of the speed reducing device 1g are similar to those of the speed reducing devices 1a and 1b, and are not redundantly described herein.

For example, the number of the at least one first roller 301a of the first roller assembly 30a is A, the number of the at least one cycloid tooth structure 311 of the cycloid disc 31 is B, the number of the at least one third roller 301c of the third roller assembly 30c is C, and the number of the at least one fixed tooth structure 50d of the first fixed tooth wheel 50c is D. Under this circumstance, the reduction ratio of the speed reducing device 1g is equal to $(A \times B)/[(A \times B)-(D \times C)]$, wherein A, B, C and D are positive integers. Moreover, the rotor portion 21 of the motor 2 is a power input terminal of the speed reducing device 1g, and the cycloid disc 31 is a power output terminal of the speed reducing device 1g.

In some embodiments, the first fixing disc 4a and the second fixing disc 4b comprise corresponding central openings 42, and the first fixed tooth wheel 50c and the second fixed tooth wheel 50f further comprises corresponding central openings 50e. The cycloid disc 31 comprises an output shaft 312. The output shaft 312 runs through a middle region of the main body 310 of the cycloid disc 31. A first end of the output shaft 312 is penetrated through the central opening 42 of the first fixing disc 4a and the central opening 50e of the first fixed tooth wheel 50c. A second end of the output shaft 312 is penetrated through the central opening 42 of the second fixing disc 4b and the central opening 50e of the second fixed tooth wheel 50f. Consequently, the output shaft 312 may be served as the power output terminal of the speed reducing device 1g.

From the above descriptions, the present disclosure provides a speed reducing device having a power source. The speed reducing device includes a motor and a speed reducing mechanism. The motor and the speed reducing mechanism are combined as an integral structure. The motor is located at the outer side of the speed reducing device along the radial direction. At least a portion of the speed reducing mechanism is located at the inner side of the speed reducing device along the radial direction. While the roller assembly is rotated with the rotor portion and the roller assembly is eccentrically revolved, the at least one cycloid tooth structure is pushed against the corresponding roller of the roller assembly. Consequently, the cycloid disc is correspondingly rotated. In such way, the purpose of reducing the speed at one stage can be achieved. Since it is not necessary to use an additional shaft coupling to connect the motor and the speed reducing mechanism, the volume and weight of the speed reducing device are reduced. Since the motor is located at the outer side of the speed reducing device along the radial direction, electromechanical integration can be easily designed. Moreover, since the electromechanical is located at the outermost region, the heat-dissipating efficacy of the speed reducing device is enhanced. The speed reducing device is a cycloid speed reducing device. Consequently, the speed reducing device has high rigidity and the high reduction ratio. Moreover, since the at least one cycloid tooth structure of the cycloid disc is formed as the outer tooth structure on the outer periphery of the main body, the tooth structure can be machined more easily.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed reducing device having a power source, the speed reducing device comprising:
   a motor served as the power source and comprising:
      a stator portion; and
      a rotor portion, wherein the rotor portion is a power input terminal of the speed reducing device, the rotor portion is driven to rotate by the stator portion, and the rotor portion comprises a rotor casing assembly with a hollow structure, wherein the rotor casing assembly comprises a ring-shaped inner wall and a ring-shaped outer wall, and an eccentricity exists between the ring-shaped inner wall and the ring-shaped outer wall of the rotor casing assembly; and
   a speed reducing mechanism, wherein at least a portion of the speed reducing mechanism is located at an inner side of the motor, and the speed reducing mechanism comprises:
      at least one roller assembly disposed within the ring-shaped inner wall of the rotor casing assembly, wherein while the roller assembly is rotated with the rotor portion, the roller assembly is eccentrically revolved, wherein the roller assembly comprises a wheel disc with a hollow portion and at least one roller, and the at least one roller is disposed on an inner wall of the wheel disc;
      a cycloid disc served as a power output terminal of the speed reducing device and disposed within the hollow portion of the wheel disc, and comprising a main body and at least one cycloid tooth structure, wherein the at least one cycloid tooth structure is protruded from an outer periphery of the main body and in contact with the corresponding roller, wherein while the roller assembly is eccentrically revolved, the at least one cycloid tooth structure is pushed against the corresponding roller, so that the cycloid disc is correspondingly rotated;
      at least one fixing disc located at an outer side of the roller assembly, wherein the fixing disc is stationary and not rotatable relative to the roller assembly; and
      a positioning assembly comprising at least one positioning structure and at least one positioning pin, wherein the at least one positioning structure is formed on the fixing disc and the at least one positioning pin is formed on the wheel disc of the roller assembly, or the at least one positioning pin is formed on the fixing disc and the at least one positioning structure is formed in the wheel disc of the roller assembly, wherein the at least one positioning pin is inserted into the corresponding positioning structure, and a radial gap is formed between the positioning pin and the corresponding positioning structure, wherein the positioning assembly and the fixing disc are collaboratively formed as a fixing end, so that the roller assembly is not rotated about its own axle.

2. The speed reducing device having the power source according to claim 1, wherein the maximum value of the radial gap is larger than or equal to twice the eccentricity.

3. The speed reducing device having the power source according to claim 1, wherein the at least one positioning structure is a positioning hole formed on the fixing disc, and the at least one positioning pin is formed on the wheel disc of the roller assembly.

4. The speed reducing device having the power source according to claim 1, wherein the at least one roller assembly comprises a first roller assembly and a second roller assembly, and the at least one fixing disc comprises a first fixing disc and a second fixing disc, wherein the first fixing disc is connected with the stator portion, located at a first outer side of the speed reducing mechanism, and disposed beside the first roller assembly, a first portion of the positioning assembly is formed on the first fixing disc, and a second portion of the positioning assembly is formed on the first roller assembly, wherein the positioning assembly and the first fixing disc are collaboratively formed as the fixing end, so that the first roller assembly is not rotated about its own axle, wherein the second fixing disc is connected with the stator portion, located at a second outer side of the speed reducing mechanism, and disposed beside the second roller assembly.

5. The speed reducing device having the power source according to claim 4, wherein the first fixing disc further comprises two extension walls, and the two extension walls are separated from each other and perpendicularly protruded from a disc surface of the first fixing disc, wherein the positioning structure is a positioning groove and defined by the two extension walls and the disc surface of the first fixing disc collaboratively, and the positioning pin is formed on the wheel disc of the first roller assembly.

6. A speed reducing device having a power source, the speed reducing device comprising:
   a motor served as the power source and comprising:

a stator portion; and a rotor portion, wherein the rotor portion is a power input terminal of the speed reducing device, the rotor portion is driven to rotate by the stator portion, and the rotor portion comprises a rotor casing assembly with a hollow structure, wherein the rotor casing assembly comprises a ring-shaped inner wall and a ring-shaped outer wall, and an eccentricity exists between the ring-shaped inner wall and the ring-shaped outer wall of the rotor casing assembly; and a speed reducing mechanism, wherein at least a portion of the speed reducing mechanism is located at an inner side of the motor, and the speed reducing mechanism comprises:

a first roller assembly disposed within the ring-shaped inner wall of the rotor casing assembly, wherein while the first roller assembly is rotated with the rotor portion, the first roller assembly is eccentrically revolved, wherein the first roller assembly comprises a first wheel disc with a hollow portion and at least one first roller, and the at least one first roller is disposed on an inner wall of the first wheel disc;

a second roller assembly disposed beside the first roller assembly, disposed within the ring-shaped inner wall of the rotor casing assembly, and linked with the first roller assembly, wherein while the second roller assembly is rotated with the rotor portion, the second roller assembly is eccentrically revolved, and the first roller assembly and the second roller assembly are synchronously rotated along the same direction, wherein the second roller assembly comprises a second wheel disc with a hollow portion and at least one second roller, and the at least one second roller is disposed on an inner wall of the second wheel disc;

a cycloid disc served as a power output terminal of the speed reducing device and disposed within the hollow portion of the second wheel disc, and comprising a main body and at least one cycloid tooth structure, wherein the at least one cycloid tooth structure is protruded from an outer periphery of the main body and in contact with the corresponding second roller, wherein while the second roller assembly is eccentrically revolved, the at least one cycloid tooth structure is pushed against the corresponding second roller, so that the cycloid disc is correspondingly rotated;

a first fixing disc is connected with the stator portion, located at a first outer side of the speed reducing mechanism, and disposed beside the first roller assembly, wherein the first fixing disc is stationary and not rotatable relative to the first roller assembly and the second roller assembly; and a positioning assembly comprising a fixed tooth wheel, wherein the fixed tooth wheel is disposed within the hollow portion of the first wheel disc and fixedly connected with the first fixing disc, wherein the fixed tooth wheel comprises at least one fixed tooth structure, and the at least one fixed tooth structure is protruded from an outer periphery of the fixed tooth wheel and in contact with the corresponding first roller, wherein the positioning assembly and the first fixing disc are collaboratively formed as a fixing end, so that the first roller assembly is not rotated about its own axle.

7. The speed reducing device having the power source according to claim 6, wherein the speed reducing device further comprises a second fixing disc, wherein the second fixing disc is connected with the stator portion, and at least a portion of the second fixing disc is located at a second outer side of the speed reducing mechanism and disposed beside the second roller assembly, wherein the second fixing disc is stationary and not rotatable.

8. The speed reducing device having the power source according to claim 7, wherein the first fixing disc comprises a central opening, the second fixing disc comprises a central opening, the fixed tooth wheel further comprises a central opening, and the cycloid disc further comprises an output shaft, wherein the output shaft runs through a middle region of the cycloid disc, a first end of the output shaft is penetrated through the central opening of the first fixing disc and the central opening of the fixed tooth wheel, and a second end of the output shaft is penetrated through the central opening of the second fixing disc.

9. A speed reducing device having a power source, the speed reducing device comprising:

a motor served as the power source and comprising:

a stator portion; and a rotor portion, wherein the rotor portion is a power input terminal of the speed reducing device, the rotor portion is driven to rotate by the stator portion, and the rotor portion comprises a rotor casing assembly with a hollow structure and a plurality of eccentric rings, wherein the plurality of eccentric rings are disposed on a ring-shaped inner wall of the rotor casing assembly, and every two adjacent eccentric rings of the plurality of eccentric rings have opposite eccentric directions;

a speed reducing mechanism, wherein at least a portion of the speed reducing mechanism is located at an inner side of the motor, and the speed reducing mechanism comprises:

a first roller assembly disposed within the corresponding eccentric ring, wherein the first roller assembly comprises a first wheel disc with a hollow portion and at least one first roller, and the at least one first roller is disposed on an inner wall of the first wheel disc;

a second roller assembly disposed within the corresponding eccentric ring, wherein the second roller assembly comprises a second wheel disc with a hollow portion and at least one second roller, and the at least one second roller is disposed on an inner wall of the second wheel disc, wherein the second roller assembly is connected and linked with the first roller assembly;

a third roller assembly disposed within the corresponding eccentric ring, wherein the third roller assembly comprises a third wheel disc with a hollow portion and at least one third roller, and the at least one third roller is disposed on an inner wall of the third wheel disc;

a fourth roller assembly disposed within the corresponding eccentric ring, wherein the fourth roller assembly comprises a fourth wheel disc with a hollow portion and at least one fourth roller, and the at least one fourth roller is disposed on an inner wall of the fourth wheel disc, wherein the fourth roller assembly is connected and linked with the third roller assembly, and an eccentric direction of the third roller assembly and the fourth roller assembly and an eccentric direction of the first roller assembly and the second roller assembly are opposite;

a cycloid disc served as a power output terminal of the speed reducing device, wherein a first portion of the cycloid disc is disposed within the hollow portion of the second wheel disc, a second portion of the cycloid disc is disposed within the hollow portion of the third wheel disc, and the cycloid disc comprises a main body and at least one cycloid tooth structure, wherein the at least one cycloid tooth structure is protruded from an outer periphery of the main body and in contact with the corresponding second roller and the corresponding third roller, wherein while the rotor portion is rotated, the at least one cycloid tooth structure is pushed against the corresponding second roller and the corresponding third roller, so that the cycloid disc is correspondingly rotated;

at least one fixing disc connected with the stator portion, wherein the at least one fixing disc is stationary and not rotatable relative to the first roller assembly, the second roller assembly, the third roller assembly and the fourth roller assembly; and a positioning assembly, wherein a first portion of the positioning assembly is disposed within the hollow portion of the first wheel disc, and a second portion of the positioning assembly is disposed within the hollow portion of the fourth wheel disc, and the positioning assembly is connected with the fixing disc, wherein the positioning assembly further comprises at least one fixed tooth wheel, the fixed tooth wheel comprises at least one fixed tooth structure, and the at least one fixed tooth structure is protruded from an outer periphery of the fixed tooth wheel, wherein each of the at least one first roller and each of the at least one fourth roller are contacted with the corresponding fixed tooth structure of the fixed tooth wheel, and the positioning assembly and the first fixing disc are collaboratively formed as a fixing end, so that the first roller assembly and the fourth roller assembly are not rotated about their own axles.

10. The speed reducing device having the power source according to claim 9, wherein the first roller assembly is located at a first outer side of the speed reducing mechanism, the second roller assembly is located at a second outer side of the speed reducing mechanism, the third roller assembly is disposed between the fourth roller assembly and the second roller assembly, the fourth roller assembly is disposed between the first roller assembly and the third roller assembly, and the fixing disc is located at the first outer side of the speed reducing mechanism and disposed beside the first roller assembly.

11. The speed reducing device having the power source according to claim 9, wherein the first roller assembly is located at a first outer side of the speed reducing mechanism, the second roller assembly is disposed between the first roller assembly and the third roller assembly, the third roller assembly is disposed between the second roller assembly and the fourth roller assembly, the fourth roller assembly is located at a second outer side of the speed reducing mechanism, and the at least one fixing disc comprises a first fixing disc and a second fixing disc, wherein the first fixing disc is located at the first outer side of the speed reducing mechanism and disposed beside the first roller assembly, and the second fixing disc is located at the second outer side of the speed reducing mechanism and disposed beside the fourth roller assembly.

12. The speed reducing device having the power source according to claim 11, wherein the at least one fixed tooth wheel comprises a first fixed tooth wheel and a second fixed tooth wheel, wherein the first fixed tooth wheel is disposed within the hollow portion of the first wheel disc of the first roller assembly, disposed between the first fixing disc and the cycloid disc, and fixedly connected with the first fixing disc, and the at least one fixed tooth structure of the first fixed tooth wheel is in contact with the corresponding first roller, wherein the second fixed tooth wheel is disposed within the hollow portion of the fourth wheel disc of the fourth roller assembly, disposed between the second fixing disc and the cycloid disc, and fixedly connected with the second fixing disc, and the at least one fixed tooth structure of the second fixed tooth wheel is in contact with the corresponding fourth roller, wherein the number of the at least one fixed tooth structure of the first fixed tooth wheel and the number of the at least one fixed tooth structure of the second fixed tooth wheel are equal.

13. The speed reducing device having the power source according to claim 9, wherein the first roller assembly is located at a first outer side of the speed reducing mechanism, the second roller assembly is disposed between the third roller assembly and the fourth roller assembly, the third roller assembly is located at a second outer side of the speed reducing mechanism, the fourth roller assembly is disposed between the first roller assembly and the second roller assembly, and the fixing disc is located at the first outer side of the speed reducing mechanism and disposed beside the first roller assembly.

14. The speed reducing device having the power source according to claim 9, wherein the first roller assembly is located at a first outer side of the speed reducing mechanism, the second roller assembly is disposed between the third roller assembly and the fourth roller assembly, the third roller assembly is disposed between the first roller assembly and the second roller assembly, the fourth roller assembly is located at a second outer side of the speed reducing mechanism, and the at least one fixing disc comprises a first fixing disc and a second fixing disc, wherein the first fixing disc is located at the first outer side of the speed reducing mechanism and disposed beside the first roller assembly, and the second fixing disc is located at the second outer side of the speed reducing mechanism and disposed beside the fourth roller assembly.

15. The speed reducing device having the power source according to claim 14, wherein the at least one fixed tooth wheel comprises a first fixed tooth wheel and a second fixed tooth wheel, wherein the first fixed tooth wheel is disposed within the hollow portion of the first wheel disc of the first roller assembly, disposed between the first fixing disc and the cycloid disc, and fixedly connected with the first fixing disc, and the at least one fixed tooth structure of the first fixed tooth wheel is in contact with the corresponding first roller, wherein the second fixed tooth wheel is disposed within the hollow portion of the fourth wheel disc of the fourth roller assembly, disposed between the second fixing disc and the cycloid disc, and fixedly connected with the second fixing disc, and the at least one fixed tooth structure of the second fixed tooth wheel is in contact with the corresponding fourth roller, wherein the number of the at least one fixed tooth structure of the first fixed tooth wheel and the number of the at least one fixed tooth structure of the second fixed tooth wheel are equal.

* * * * *